United States Patent
Aiba et al.

(10) Patent No.: US 12,349,125 B2
(45) Date of Patent: Jul. 1, 2025

(54) USER EQUIPMENTS, BASE STATIONS AND METHODS FOR INDICATION OF UPLINK TRANSMISSION

(71) Applicant: SHARP KABUSHIKI KAISHA, Sakai (JP)

(72) Inventors: Tatsushi Aiba, Sakai (JP); Kai Ying, Vancouver, WA (US); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 549 days.

(21) Appl. No.: 17/605,365

(22) PCT Filed: Mar. 23, 2020

(86) PCT No.: PCT/JP2020/012758
§ 371 (c)(1),
(2) Date: Oct. 21, 2021

(87) PCT Pub. No.: WO2020/217808
PCT Pub. Date: Oct. 29, 2020

(65) Prior Publication Data
US 2022/0225364 A1   Jul. 14, 2022

Related U.S. Application Data

(60) Provisional application No. 62/837,325, filed on Apr. 23, 2019.

(51) Int. Cl.
*H04W 72/12* (2023.01)
*H04L 1/1812* (2023.01)
(Continued)

(52) U.S. Cl.
CPC ....... *H04W 72/1268* (2013.01); *H04L 1/1812* (2013.01); *H04L 5/0053* (2013.01); *H04W 72/23* (2023.01)

(58) Field of Classification Search
CPC ............. H04W 72/1268; H04W 72/23; H04W 72/20; H04L 1/1812; H04L 5/0053; H04L 5/0007; H04L 5/0094; H04L 5/0044
See application file for complete search history.

(56) References Cited

U.S. PATENT DOCUMENTS 8,855,027 B2 * 10/2014 Kim ................... H04W 72/23
                                                         370/278
11,043,993 B2 * 6/2021 Yang ................... H04B 7/0456
(Continued)

OTHER PUBLICATIONS

3GPP TS 36.214 V15.5.0 (Dec. 2019) 3rd Generation Partnership Project; Technical Specification Group Radio Access Network; Evolved Universal Terrestrial Radio Access (E-UTRA); Physical layer; Measurements (Release 15).
(Continued)

*Primary Examiner* — Atique Ahmed
(74) *Attorney, Agent, or Firm* — ScienBiziP, P.C.

(57) ABSTRACT

A user equipment (UE) is described. The UE includes receiving circuitry configured to receive a first DCI format comprising one bit of an uplink shared channel (UL-SCH) indicator, the first DCI format being used for scheduling of a PUSCH. The receiving circuitry is also configured to receive a second DCI format comprising more than one bits of an UL-SCH indicator, the second DCI format being used for scheduling of a PUSCH. The UE also includes transmitting circuitry configured to perform, based on a detection of the first DCI format, a transmission on the PUSCH. The transmitting circuitry is also configured to perform, based on a detection of the second DCI format, a transmission on the PUSCH. The one bit of the UL-SCH indicator is used for indicating whether or not UL-SCH is transmitted on the PUSCH. The more than one bits of the UL-SCH indicator are used for indicating whether or not UCI is transmitted on the PUSCH.

2 Claims, 11 Drawing Sheets

First DCI Format 601

| Beta-Offset Indicator | Descriptions |
|---|---|
| '00' | 1st offset value(s) configured by higher layers |
| '01' | 2nd offset value(s) configured by higher layers |
| '10' | 3rd offset value(s) configured by higher layers |
| '11' | 4th offset value(s) configured by higher layers |

| UL-SCH Indicator | Descriptions |
|---|---|
| '0' | UL-SCH(s) is not transmitted on the PUSCH |
| '1' | UL-SCH(s) is transmitted on the PUSCH |

Second DCI Format 603

| UL-SCH Indicator | Descriptions |
|---|---|
| '00' | UCI(s) is not transmitted on the PUSCH |
| '01' | UCI(s) is transmitted on the PUSCH |
| '10' | 1st offset value(s) configured by higher layers |
| '11' | 2nd offset value(s) configured by higher layers |

(51) Int. Cl.
*H04L 5/00* (2006.01)
*H04W 72/1268* (2023.01)
*H04W 72/23* (2023.01)

(56) References Cited

U.S. PATENT DOCUMENTS

| | | | |
|---|---|---|---|
| 2010/0128614 A1 | 5/2010 | Kuusela et al. | |
| 2011/0201341 A1* | 8/2011 | Choudhury | H04W 72/27 455/450 |
| 2011/0305211 A1 | 12/2011 | Lunttila et al. | |
| 2013/0121278 A1* | 5/2013 | Noh | H04L 5/0041 370/329 |
| 2016/0037492 A1* | 2/2016 | Xu | H04W 72/23 370/280 |
| 2018/0070369 A1* | 3/2018 | Papasakellariou | H04W 72/20 |
| 2019/0215897 A1* | 7/2019 | Babaei | H04W 76/28 |
| 2020/0154467 A1* | 5/2020 | Gong | H04L 5/0055 |
| 2020/0305168 A1* | 9/2020 | Liou | H04W 76/11 |
| 2020/0313831 A1* | 10/2020 | Kim | H04L 5/001 |
| 2020/0358487 A1* | 11/2020 | Yang | H04L 1/1819 |
| 2021/0273699 A1* | 9/2021 | Cao | H04B 7/088 |

OTHER PUBLICATIONS

3GPP TS 36.213 V15.5.0 (Mar. 2019) 3rd Generation Partnership Project; Technical Specification Group Radio Access Network; Evolved Universal Terrestrial Radio Access (E-UTRA); Physical layer procedures (Release 15).
3GPP TS 36.212 V15.5.0 (Mar. 2019) 3rd Generation Partnership Project; Technical Specification Group Radio Access Network; Evolved Universal Terrestrial Radio Access (E-UTRA); Multiplexing and channel coding (Release 15).
3GPP TS 38.211 V15.5.0 (Mar. 2019) 3rd Generation Partnership Project; Technical Specification Group Radio Access Network; NR; Physical channels and modulation (Release 15).
Qualcomm Incorporated, "Summary of PUCCH maintenance", R1-1809927, 3GPP TSG RAN WG1 Meeting #93, Busan, Korea, May 21-25, 2018.

* cited by examiner

Supported Transmission Numerologies 201

| $\mu$ | $\Delta f = 2^\mu \cdot 15 [\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Number of OFDM Symbols Per Slot 203

| | Slot configuration | | | | | |
|---|---|---|---|---|---|---|
| | 0 | | | 1 | | |
| $\mu$ | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

FIG. 2

Second DCI Format 603

| UL-SCH Indicator | Descriptions |
|---|---|
| '00' | UCI(s) is not transmitted on the PUSCH |
| '01' | UCI(s) is transmitted on the PUSCH |
| '10' | 1st offset value(s) configured by higher layers |
| '11' | 2nd offset value(s) configured by higher layers |

First DCI Format 601

| Beta-Offset Indicator | Descriptions |
|---|---|
| '00' | 1st offset value(s) configured by higher layers |
| '01' | 2nd offset value(s) configured by higher layers |
| '10' | 3rd offset value(s) configured by higher layers |
| '11' | 4th offset value(s) configured by higher layers |

| UL-SCH Indicator | Descriptions |
|---|---|
| '0' | UL-SCH(s) is not transmitted on the PUSCH |
| '1' | UL-SCH(s) is transmitted on the PUSCH |

FIG. 6

USER EQUIPMENTS, BASE STATIONS AND METHODS FOR INDICATION OF UPLINK TRANSMISSION

TECHNICAL FIELD

The present disclosure relates generally to communication systems. More specifically, the present disclosure relates to user equipment (UE), base stations, and methods for indication of uplink transmission.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE) comprising: receiving circuitry configured to receive a first downlink control information (DCI) format comprising one bit of an uplink shared channel (UL-SCH) indicator, the first DCI format being used for scheduling of a physical uplink shared channel (PUSCH), the receiving circuitry configured to receive a second DCI format comprising more than one bits of an UL-SCH indicator, the second DCI format being used for scheduling of a PUSCH; and transmitting circuitry configured to perform, based on a detection of the first DCI format, a transmission on the PUSCH, the transmitting circuitry configured to perform, based on a detection of the second DCI format, a transmission on the PUSCH, wherein the one bit of the UL-SCH indicator is used for indicating whether or not UL-SCH is transmitted on the PUSCH, and the more than one bits of the UL-SCH indicator are used for indicating whether or not uplink control information (UCI) is transmitted on the PUSCH.

In one example, a base station apparatus comprising: transmitting circuitry configured to transmit a first downlink control information (DCI) format comprising one bit of an uplink shared channel (UL-SCH) indicator, the first DCI format being used for scheduling of a physical uplink shared channel (PUSCH), the transmitting circuitry configured to transmit a second DCI format comprising more than one bits of an UL-SCH indicator, the second DCI format being used for scheduling of a PUSCH; and receiving circuitry configured to perform, based on the transmission of the first DCI format, a reception on the PUSCH, the receiving circuitry configured to perform, based on the transmission of the second DCI format, a reception on the PUSCH, wherein the one bit of the UL-SCH indicator is used for indicating whether or not UL-SCH is transmitted on the PUSCH, and the more than one bits of the UL-SCH indicator are used for indicating whether or not uplink control information (UCI) is transmitted on the PUSCH.

In one example, a communication method of a user equipment (UE) comprising: receiving a first downlink control information (DCI) format comprising one bit of an uplink shared channel (UL-SCH) indicator, the first DCI format being used for scheduling of a physical uplink shared channel (PUSCH); receiving a second DCI format comprising more than one bits of an UL-SCH indicator, the second DCI format being used for scheduling of a PUSCH; performing, based on a detection of the first DCI format, a transmission on the PUSCH; and performing, based on a detection of the second DCI format, a transmission on the PUSCH, wherein the one bit of the UL-SCH indicator is used for indicating whether or not UL-SCH is transmitted on the PUSCH, and the more than one bits of the UL-SCH indicator are used for indicating whether or not uplink control information (UCI) is transmitted on the PUSCH.

In one example, a communication method of a base station apparatus comprising: transmitting a first downlink control information (DCI) format comprising one bit of an uplink shared channel (UL-SCH) indicator, the first DCI format being used for scheduling of a physical uplink shared channel (PUSCH); transmitting a second DCI format comprising more than one bits of an UL-SCH indicator, the second DCI format being used for scheduling of a PUSCH; performing, based on the transmission of the first DCI format, a reception on the PUSCH; and performing, based on the transmission of the second DCI format, a reception on the PUSCH, wherein the one bit of the UL-SCH indicator is used for indicating whether or not UL-SCH is transmitted on the PUSCH, and the more than one bits of the UL-SCH indicator are used for indicating whether or not uplink control information (UCI) is transmitted on the PUSCH.

BRIEF DESCRIPTION OF DRAWINGS

FIG. 2 shows examples of multiple numerologies.

FIG. 6 examples of an indication for UL transmission.

DESCRIPTION OF EMBODIMENTS

Figure 1:
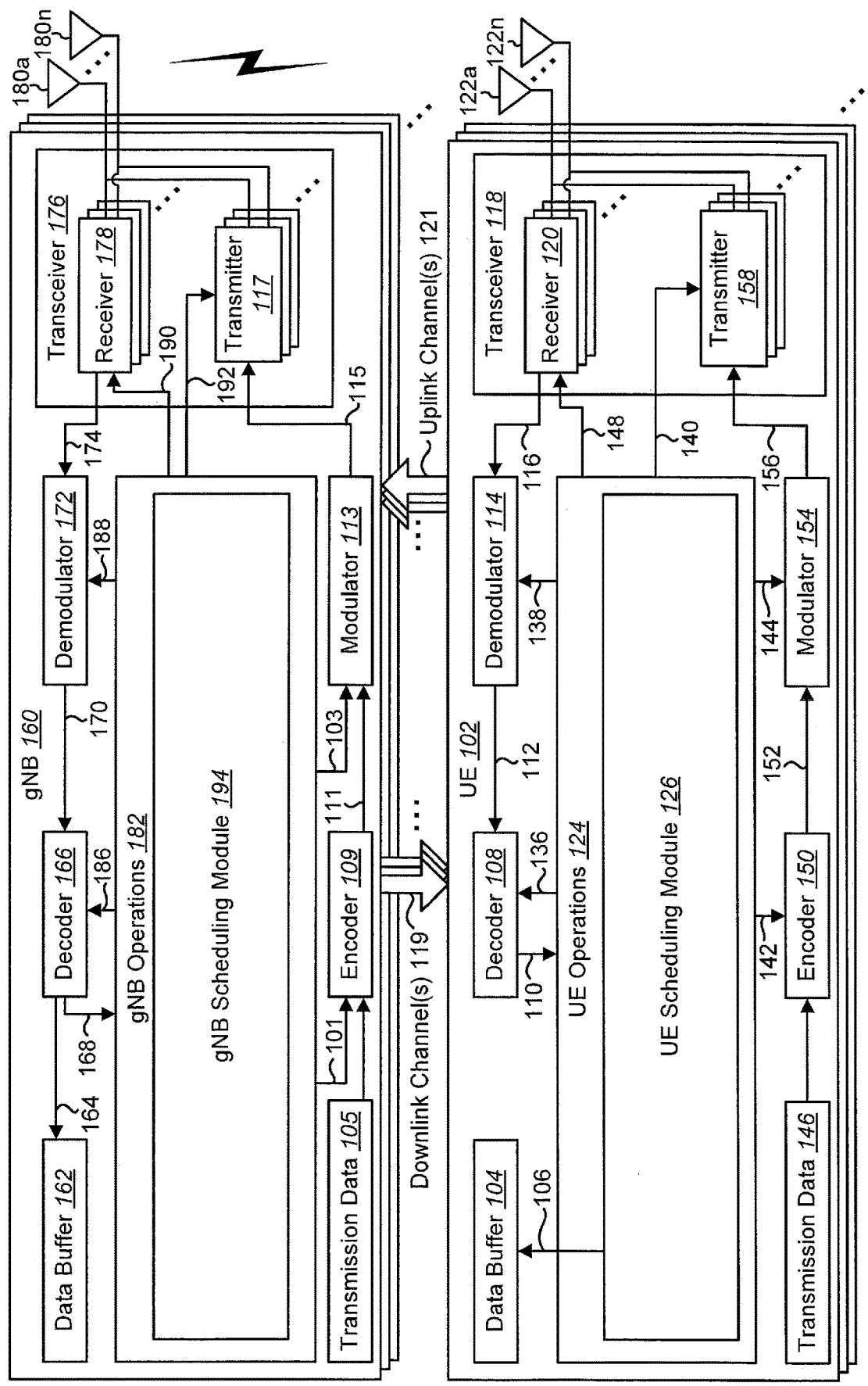
FIG. 1 is a block diagram illustrating one implementation of one or more gNBs and one or more UEs in which systems and methods for signaling may be implemented.

A user equipment (UE) is described. The UE includes receiving circuitry configured to receive a first downlink control information (DCI) format that includes one bit of an uplink shared channel (UL-SCH) indicator, the first DCI format being used for scheduling of a PUSCH. The receiving circuitry is also configured to receive a second DCI format that includes more than one bits of an UL-SCH indicator, the second DCI format being used for scheduling of a PUSCH. The UE also includes transmitting circuitry configured to perform, based on a detection of the first DCI format, a transmission on the PUSCH. The transmitting circuitry is also configured to perform, based on a detection of the second DCI format, a transmission on the PUSCH. The one bit of the UL-SCH indicator is used for indicating whether or not UL-SCH is transmitted on the PUSCH. The more than one bits of the UL-SCH indicator are used for indicating whether or not uplink control information (UCI) is transmitted on the PUSCH.

The UCI may be transmitted together with UL-SCH on the PUSCH. The more than one bits of the UL-SCH indicator may be further used for indicating a value corresponding to an offset value used for determining a number of resources for UCI transmitted on the PUSCH.

The receiving circuitry may be configured to receive a radio resource control (RRC) message that includes information used for configuring the number of bits for the UL-SCH indicator included in the second DCI format. In a case that one bit is configured for the UL-SCH indicator, the one bit of the UL-SCH indicator may be used for indicating whether or not UL-SCH is transmitted on the PUSCH.

The UCI may include hybrid automatic repeat request-acknowledgement (HARQ-ACK) and/or channel state information (CSI).

A base station apparatus is also described. The base station includes transmitting circuitry configured to transmit a first DCI format that includes one bit of an UL-SCH indicator, the first DCI format being used for scheduling of a PUSCH. The transmitting circuitry is also configured to transmit a second DCI format that includes more than one bits of an UL-SCH indicator, the second DCI format being used for scheduling of a PUSCH. The base station apparatus also includes receiving circuitry configured to perform, based on the transmission of the first DCI format, a reception on the PUSCH. The receiving circuitry is also configured to perform, based on the transmission of the second DCI format, a reception on the PUSCH. The one bit of the UL-SCH indicator is used for indicating whether or not UL-SCH is transmitted on the PUSCH. The more than one bits of the UL-SCH indicator are used for indicating whether or not UCI is transmitted on the PUSCH.

A communication method of a UE is also described. The method includes receiving a first DCI format that includes one bit of an UL-SCH indicator, the first DCI format being used for scheduling of a PUSCH. The method also includes receiving a second DCI format that includes more than one bits of an UL-SCH indicator, the second DCI format being used for scheduling of a PUSCH. The method further includes performing, based on a detection of the first DCI format, a transmission on the PUSCH. The method additionally includes performing, based on a detection of the second DCI format, a transmission on the PUSCH. The one bit of the UL-SCH indicator is used for indicating whether or not UL-SCH is transmitted on the PUSCH. The more than one bits of the UL-SCH indicator are used for indicating whether or not UCI is transmitted on the PUSCH.

A communication method of a base station apparatus is also described. The method includes transmitting a first DCI format that includes one bit of an UL-SCH indicator, the first DCI format being used for scheduling of a PUSCH. The method also includes transmitting a second DCI format that includes more than one bits of an UL-SCH indicator, the second DCI format being used for scheduling of a PUSCH. The method further includes performing, based on the transmission of the first DCI format, a reception on the PUSCH. The method additionally includes performing, based on the transmission of the second DCI format, a reception on the PUSCH. The one bit of the UL-SCH indicator is used for indicating whether or not UL-SCH is transmitted on the PUSCH. The more than one bits of the UL-SCH indicator are used for indicating whether or not UCI is transmitted on the PUSCH.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra Reliable and Low Latency Communication) transmission, and eMTC (massive Machine Type Communication) transmission. And, in NR, transmissions for different services may be specified (e.g., configured) for one or more bandwidth parts (BWPs) in a serving cell and/or for one or more serving cells. A user equipment (UE) may perform a reception(s) of a downlink signal(s) and/or a transmission(s) of an uplink signal(s) in the BWP(s) of the serving cell(s).

In order for the services to use the time, frequency, and/or space resources efficiently, it would be useful to be able to efficiently control downlink and/or uplink transmissions. Therefore, a procedure for efficient control of downlink and/or uplink transmissions should be designed. Accordingly, a detailed design of a procedure for downlink and/or uplink transmissions may be beneficial.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for signaling may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (physical uplink shared channel)) and/or a physical control channel (e.g., PUCCH (physical uplink control channel)), etc. The one or more gNBs 160 may also transmit information or data to the one or more UEs 102 using one or more downlink channels 119, for instance. Examples of downlink channels 119 include a physical shared channel (e.g., PDCCH (physical downlink shared channel) and/or a physical control channel (PDCCH (physical downlink control channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform downlink reception(s) and uplink transmission(s). The downlink reception(s) include reception of data, reception of downlink control information, and/or reception of downlink reference signals. Also, the uplink transmissions include transmission of data, transmission of uplink control information, and/or transmission of uplink reference signals.

In a radio communication system, physical channels (uplink physical channels and/or downlink physical channels) may be defined. The physical channels (uplink physical channels and/or downlink physical channels) may be used for transmitting information that is delivered from a higher layer.

For example, in uplink, a PRACH (Physical Random Access Channel) may be defined. In some approaches, the PRACH (e.g., the random access procedure) may be used for an initial access connection establishment procedure, a handover procedure, a connection re-establishment, a timing adjustment (e.g., a synchronization for an uplink transmission, for UL synchronization) and/or for requesting an uplink shared channel (UL-SCH) resource (e.g., the uplink physical shared channel (PSCH) (e.g., PUCCH) resource).

In another example, a physical uplink control channel (PUCCH) may be defined. The PUCCH may be used for transmitting uplink control information (UCI). The UCI may include hybrid automatic repeat request-acknowledgement (HARQ-ACK), channel state information (CSI) and/or a scheduling request (SR). The HARQ-ACK is used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI is used for indicating state of downlink channel (e.g., downlink signal(s)). Also, the SR is used for requesting resources of uplink data (e.g., Transport block(s), MAC PDU and/or Uplink Shared Channel (UL-SCH)).

Here, the DL-SCH and/or the UL-SCH may be a transport channel that is used in the MAC layer. Also, a transport block(s) (TB(s)) and/or a MAC PDU may be defined as a unit(s) of the transport channel used in the MAC layer. The transport block may be defined as a unit of data delivered from the MAC layer to the physical layer. The MAC layer may deliver the transport block to the physical layer (e.g., the MAC layer delivers the data as the transport block to the physical layer). In the physical layer, the transport block may be mapped to one or more codewords.

In downlink, a physical downlink control channel (PDCCH) may be defined. The PDCCH may be used for transmitting downlink control information (DCI). Here, more than one DCI formats may be defined for DCI transmission on the PDCCH. Namely, fields may be defined in the DCI format(s), and the fields are mapped to the information bits (e.g., DCI bits).

For example, a DCI format 1_0 that is used for scheduling of the PDSCH in the cell may be defined as the DCI format for the downlink. Also, as described herein one or more Radio Network Temporary Identifiers (e.g., the Cell RNTI(s) (C-RNTI(s)), the Configured Scheduling RNTI(s) (CS-RNTI(s)), the System Information RNTI(s) (SI-RNTI(s)), the Random Access RNTI(s) (RA-RNTI(s)), and/or a first RNTI may be used to transmit the DCI format 1_0. Also, the DCI format 1_0 may be monitored (e.g., transmitted, mapped) in the Common Search Space (CSS) and/or the UE Specific Search space (USS). Alternatively, the DCI format 1_0 may be monitored (e.g., transmitted, mapped) in the CSS only.

For example, the DCI included in the DCI format 1_0 may be a frequency domain resource assignment (e.g., for the PDSCH). Additionally or alternatively, the DCI included in the DCI format 1_0 may be a time domain resource assignment (e.g., for the PDSCH). Additionally or alternatively, the DCI included in the DCI format 1_0 may be a modulation and coding scheme (e.g., for the PDSCH). Additionally or alternatively, or alternatively, the DCI included in the DCI format 1_0 may be a new data indicator. Additionally or alternatively, the DCI included in the DCI format 1_0 may be a TPC (e.g., Transmission Power Control) command for scheduled PUCCH. Additionally or alternatively, the DCI included in the DCI format 1_0 may be a PUCCH resource indicator. Additionally or alternatively, the DCI included in the DCI format 1_0 may be a PDSCH-to-HARQ feedback timing indicator. Additionally or alternatively, the DCI included in the DCI format 1_0 may be a priority indication (e.g., for the PDSCH transmission and/or the PDSCH reception). Additionally or alternatively, the DCI included in the DCI format 1_0 may be the priority indication (e.g., for the HARQ-ACK transmission for the PDSCH and/or the HARQ-ACK reception for the PDSCH). Namely, a beta-offset indicator may not be included in the DCI format 1_0.

Here, the priority indication may be used for indicating a priority (e.g., 2-bit information, 00: the lowest priority, 01: the lower priority, 10: the higher priority, and/or 11: the highest priority) for the PDSCH transmission and/or the PDSCH reception. For example, in a case that the UE 102 detects (e.g., decode, receive) the DCI format for the downlink including the priority indication, the UE 102 may identify the PDSCH transmission and/or the PDSCH reception is prioritized (e.g., the PDSCH transmission and/or the PDSCH reception has the higher priority, the highest priority, the lower priority, and/or the lowest priority).

Additionally or alternatively, the priority indication may be used for indicating a priority (e.g., 2-bit information, 00: the lowest priority, 01: the lower priority, 10: the higher priority, and/or 11: the highest priority) for the HARQ-ACK transmission for the PDSCH and/or the HARQ-ACK reception for the PDSCH. For example, in a case that the UE 102 detects the DCI format for the downlink including the priority indication, the UE 102 may identify the HARQ-ACK transmission for the PDSCH and/or the HARQ-ACK reception for the PDSCH is prioritized (e.g., the HARQ-ACK transmission for the PDSCH and/or the HARQ-ACK reception for the PDSCH has the higher priority, the highest priority, the lower priority, and/or the lowest priority). Additionally or alternatively, in a case that the UE 102 detects the DCI format for the downlink including the priority indication, the UE 102 may generate two HARQ-ACK codebooks for two PDSCH transmissions. For example, in a case that the UE 102 detects the DCI format for the downlink including the priority indication, a first HARQ-ACK codebook for a first PDSCH transmission is generate, a second HARQ-ACK codebook for a second PDSCH transmission is generated. Additionally or alternatively, the UE 102 may simultaneously transmit, (for example, in a symbol(s) and/or in a slot(s)), two HARQ-ACK codebooks. Namely, the UE 102 may simultaneously transmit, (for example, in a symbol(s) and/or in a slot(s)), the first HARQ-ACK corresponding to the first HARQ-ACK codebook and the second HARQ-ACK corresponding to the second HARQ-ACK codebook.

Additionally or alternatively, a DCI format 1_1 that is used for scheduling of the PDSCH in the cell may be defined as the DCI format for the downlink. Additionally or alternatively, the C-RNTI, the CS-RNTI, and/or the first RNTI may be used to transmit the DCI format 1_1. Additionally or alternatively, the DCI format 1_1 may be monitored (e.g., transmitted and/or mapped) in the CSS and/or the USS.

For example, the DCI included in the DCI format 1_1 may be a BWP indicator (e.g., for the PDSCH). Additionally or alternatively, the DCI included in the DCI format 1_1 may be frequency domain resource assignment (e.g., for the PDSCH). Additionally or alternatively, the DCI included in the DCI format 1_1 may be a time domain resource assignment (e.g., for the PDSCH). Additionally or alternatively, the DCI included in the DCI format 1_1 may be a modulation and coding scheme (e.g., for the PDSCH). Additionally or alternatively, the DCI included in the DCI format 1_1 may be a new data indicator. Additionally or alternatively, the DCI included in the DCI format 1_1 may be a TPC command for scheduled PUCCH. Additionally or alternatively, the DCI included in the DCI format 1_1 may be a CSI request that is used for requesting (e.g., triggering) transmission of the CSI (e.g., CSI reporting (e.g., aperiodic CSI reporting)). Additionally or alternatively, the DCI included in the DCI format 1_1 may be a PUCCH resource indicator. Additionally or alternatively, the DCI included in the DCI format 1_1 may be a PDSCH-to-HARQ feedback timing indicator. Additionally or alternatively, the DCI included in the DCI format 1_1 may be the priority indication (e.g., for the PDSCH transmission and/or the PDSCH reception). Additionally or alternatively, the DCI included in the DCI format 1_1 may be the priority indication (e.g., for the HARQ-ACK transmission for the PDSCH and/or the HARQ-ACK reception for the PDSCH). Additionally or alternatively, the DCI included in the DCI format 1_1 may be a beta-offset indicator.

Additionally or alternatively, a DCI format 1_X that is used for scheduling of the PDSCH in the cell may be defined as the DCI format for the downlink. Additionally or alternatively, the C-RNTI, the CS-RNTI, and/or the first RNTI may be used to transmit the DCI format 1_X. Additionally or alternatively, the DCI format 1_X may be monitored (e.g., transmitted and/or mapped) in the CSS and/or the USS.

For example, the DCI included in the DCI format 1_X may be a BWP indicator (e.g., for the PDSCH). Additionally or alternatively, the DCI included in the DCI format 1_X may be frequency domain resource assignment (e.g., for the PDSCH). Additionally or alternatively, the DCI included in the DCI format 1_X may be a time domain resource assignment (e.g., for the PDSCH). Additionally or alternatively, the DCI included in the DCI format 1_X may be a modulation and coding scheme (e.g., for the PDSCH). Additionally or alternatively, the DCI included in the DCI format 1_X may be a new data indicator. Additionally or alternatively, the DCI included in the DCI format 1_X may be a TPC command for scheduled PUCCH. Additionally or alternatively, the DCI included in the DCI format 1_X may be a CSI request that is used for requesting (e.g., triggering) transmission of the CSI (e.g., CSI reporting (e.g., aperiodic CSI reporting)). Additionally or alternatively, the DCI included in the DCI format 1_X may be a PUCCH resource indicator. Additionally or alternatively, the DCI included in the DCI format 1_X may be a PDSCH-to-HARQ feedback timing indicator. Additionally or alternatively, the DCI included in the DCI format 1_X may be the priority indication (e.g., for the PDSCH transmission and/or the PDSCH reception). Additionally or alternatively, the DCI included in the DCI format 1_X may be the priority indication (e.g., for the HARQ-ACK transmission for the PDSCH and/or the HARQ-ACK reception for the PDSCH). Additionally or alternatively, the DCI included in the DCI format 1_X may be a beta-offset indicator.

Here, the DCI format 1_X (and/or the DCI format 1_X including the priority indication) may be used for indicating a priority (e.g., the higher priority, the highest priority, the lower priority, and/or the lowest priority) for the PDSCH transmission and/or the PDSCH reception. For example, in a case that the UE 102 detects the DCI format 1_X (and/or the DCI format 1_X including the priority indication), the UE 102 may identify the PDSCH transmission and/or the PDSCH reception is prioritized (e.g., the PDSCH transmission and/or the PDSCH reception has the higher priority, the highest priority, the lower priority, and/or the lowest priority).

Additionally or alternatively, the DCI format 1_X (and/or the DCI format 1_X including the priority indication, and/or the DCI format 1_X with the CRC scrambled by the first RNTI, and/or the DCI format 1_X with the CRC scrambled by the first RNTI including the priority indication) may be used for indicating a priority (e.g., the higher priority, the highest priority, the lower priority, and/or the lowest priority) for the HARQ-ACK transmission for the PDSCH and/or the HARQ-ACK reception for the PDSCH. For example, in a case that the UE 102 detects the DCI format 1_X (and/or the DCI format 1_X including the priority indication, and/or the DCI format 1_X with the CRC scrambled by the first RNTI, and/or the DCI format 1_X with the CRC scrambled by the first RNTI including the priority indication), the UE 102 may identify the HARQ-ACK transmission for the PDSCH and/or the HARQ-ACK reception for the PDSCH is prioritized (e.g., the HARQ-ACK transmission for the PDSCH and/or the HARQ-ACK reception for the PDSCH has the higher priority, the highest priority, the lower priority, and/or the lowest priority).

Additionally or alternatively, in a case that the UE 102 detects the DCI format 1_X (and/or the DCI format 1_X including the priority indication, and/or the DCI format 1_X with the CRC scrambled by the first RNTI, and/or the DCI format 1_X with the CRC scrambled by the first RNTI including the priority indication), the UE 102 may generate two HARQ-ACK codebooks for two PDSCH transmissions. For example, in a case that the UE 102 detects the DCI format for the downlink including the priority indication, a first HARQ-ACK codebook for a first PDSCH transmission is generate, a second HARQ-ACK codebook for a second PDSCH transmission is generated. Additionally or alternatively, the UE 102 may simultaneously transmit, (for example, in a symbol(s) and/or in a slot(s)), two HARQ-ACK codebooks. Namely, the UE 102 may simultaneously transmit, (for example, in a symbol(s) and/or in a slot(s)), the first HARQ-ACK corresponding to the first HARQ-ACK codebook and the second HARQ-ACK corresponding to the second HARQ-ACK codebook.

Additionally or alternatively, a DCI format 0_0 that is used for scheduling of the PUSCH in the cell may be defined as the DCI format for the uplink. Additionally or alternatively, the C-RNTI, the CS-RNTI, the Temporary C-RNTI, and/or the first RNTI may be used to transmit the DCI format 0_0. Additionally or alternatively, the DCI format 0_0 may be monitored (e.g., transmitted, mapped) in the CSS and/or the USS. Alternatively, the DCI format 0_0 may be monitored (e.g., transmitted, mapped) in the CSS only.

For example, the DCI included in the DCI format 0_0 may be a frequency domain resource assignment (e.g., for the PUSCH). Additionally or alternatively, the DCI included in the DCI format 0_0 may be a time domain resource assignment (e.g., for the PUSCH). Additionally or alternatively, the DCI included in the DCI format 0_0 may be a modulation and coding scheme (e.g., for the PUSCH). Additionally or alternatively, the DCI included in the DCI format 0_0 may be a new data indicator. Additionally or alternatively, the DCI included in the DCI format 0_0 may be a redundancy version. Additionally or alternatively, the DCI included in the DCI format 0_0 may be a TPC command for scheduled PUSCH. Additionally or alternatively, the DCI included in the DCI format 0_0 may be the priority indication (e.g., for the PUSCH transmission and/or for the PUSCH reception). Namely, a beta-offset indicator may not be included in the DCI format 0_0. Also, an UL-SCH indicator may not be included in the DCI format 0_0.

Here, the priority indication may be used for indicating a priority (e.g., 2-bit information, 00: the lowest priority, 01: the lower priority, 10: the higher priority, and/or 11: the highest priority) for the PUSCH transmission and/or the PUSCH reception. For example, in a case that the UE 102 detects the DCI format for the uplink including the priority indication, the UE 102 may identify the PUSCH transmission and/or the PUSCH reception is prioritized (e.g., the PUSCH transmission and/or the PUSCH reception has the higher priority, the highest priority, the lower priority, and/or the lowest priority). Additionally or alternatively, in a case that the UE 102 detects the DCI format for the uplink including the priority indication, the UE 102 may generate two PUSCHs for two UL-SCH transmissions. For example, in a case that the UE 102 detects the DCI format for the uplink including the priority indication, a first transmission on a first PUSCH (e.g., for a first UL-SCH, to which a first UL-SCH is mapped) is performed, a second transmission on a second PUSCH (e.g., for a second UL-SCH, to which a second UL-SCH is mapped) is performed. Additionally or alternatively, the UE 102 may perform, (for example, in a symbol(s) and/or in a slot(s)), a simultaneous transmission of two PUSCHs. For example, the UE 102 may perform, (for example, in a symbol(s) and/or in a slot(s)), the simultaneous transmission of the first PUSCH corresponding to the first UL-SCH and the second PUSCH corresponding to the second UL-SCH.

Additionally or alternatively, a DCI format 0_1 that is used for scheduling of the PUSCH in the cell may be defined as the DCI format for the uplink. Here, the DCI format 0_1 may be described as a first DCI format 601. Additionally or alternatively, the C-RNTI, the CS-RNTI may be used to transmit the DCI format 0_1 (i.e., the first DCI format 601). Namely, the first DCI format 601 may be the DCI format 0_1 with the CRC scrambled by the C-RNTI and/or the CS-RNTI. Here, as described below, the DCI format 0_1 with the CRC scrambled by the first RNTI may be a second DCI format 603. Additionally or alternatively, the DCI format 0_1 (i.e., the first DCI format 601) may be monitored (e.g., transmitted, mapped) in the CSS and/or the USS.

For example, the DCI included in the DCI format 0_1 may be a BWP indicator (e.g., for the PUSCH). Additionally or alternatively, the DCI included in the DCI format 0_1 may be a frequency domain resource assignment (e.g., for the PUSCH). Additionally or alternatively, the DCI included in the DCI format 0_1 may be a time domain resource assignment (e.g., for the PUSCH). Additionally or alternatively, the DCI included in the DCI format 0_1 may be a modulation and coding scheme (e.g., for the PUSCH). Additionally or alternatively, the DCI included in the DCI format 0_1 may be a new data indicator. Additionally or alternatively, the DCI included in the DCI format 0_1 may be a TPC command for scheduled PUSCH. Additionally or alternatively, the DCI included in the DCI format 0_1 may be a CSI request that is used for requesting the CSI reporting. Additionally or alternatively, as described below, the DCI included in the DCI format 0_1 may be information used for indicating an index of a configuration of a configured grant. Additionally or alternatively, the DCI included in the DCI format 0_1 may be the priority indication (e.g., for the PUSCH transmission and/or for the PUSCH reception). Additionally or alternatively, the DCI included in the DCI format 0_1 may be a beta-offset indicator. Additionally or alternately, the DCI included in the DCI format 0_1 may be an UL-SCH indicator.

Additionally or alternatively, a DCI format 0_Y that is used for scheduling of the PUSCH in the cell may be defined as the DCI format for the uplink. Additionally or alternatively, the C-RNTI, the CS-RNTI and/or the first RNTI may be used to transmit the DCI format 0_Y. Additionally or alternatively, the DCI format 0_Y may be monitored (e.g., transmitted, mapped) in the CSS and/or the USS.

For example, the DCI included in the DCI format 0_Y may be a BWP indicator (e.g., for the PUSCH). Additionally or alternatively, the DCI included in the DCI format 0_Y may be a frequency domain resource assignment (e.g., for the PUSCH). Additionally or alternatively, the DCI included in the DCI format 0_Y may be a time domain resource assignment (e.g., for the PUSCH). Additionally or alternatively, the DCI included in the DCI format 0_Y may be a modulation and coding scheme (e.g., for the PUSCH). Additionally or alternatively, the DCI included in the DCI format 0_Y may be a new data indicator. Additionally or alternatively, the DCI included in the DCI format 0_Y may be a TPC command for scheduled PUSCH. Additionally or alternatively, the DCI included in the DCI format 0_Y may be a CSI request that is used for requesting the CSI reporting. Additionally or alternatively, as described below, the DCI included in the DCI format 0_Y may be information used for indicating an index of a configuration of a configured grant. Additionally or alternatively, the DCI included in the DCI format 0_Y may be the priority indication (e.g., for the PUSCH transmission and/or for the PUSCH reception). Additionally or alternatively, the DCI included in the DCI format 0_1 may be a beta-offset indicator. Additionally or alternately, the DCI included in the DCI format 0_1 may be an UL-SCH indicator.

Here, the DCI format 0_Y (and/or the DCI format 0_Y including the priority indication, and/or the DCI format 0_Y with the CRC scrambled by the first RNTI, and/or the DCI format 0_Y with the CRC scrambled by the first RNTI including the priority indication) may be used for indicating a priority (e.g., the higher priority, the highest priority, the lower priority, and/or the lowest priority) for the PUSCH transmission and/or the PUSCH reception. For example, in a case that the UE 102 detects the DCI format 0_Y (and/or the DCI format 0_Y including the priority indication, and/or the DCI format 0_Y with the CRC scrambled by the first RNTI, and/or the DCI format 0_Y with the CRC scrambled by the first RNTI including the priority indication), the UE 102 may identify the PUSCH transmission and/or the PUSCH reception is prioritized (e.g., the PUSCH transmission and/or the PUSCH reception has the higher priority, the highest priority, the lower priority, and/or the lowest priority).

Additionally or alternatively, in a case that the UE 102 detects the DCI format 0_Y (and/or the DCI format 0_Y including the priority indication, and/or the DCI format 0_Y with the CRC scrambled by the first RNTI, and/or the DCI format 0_Y with the CRC scrambled by the first RNTI including the priority indication), the UE 102 may generate two PUSCHs for two UL-SCH transmissions. For example, in a case that the UE 102 detects the DCI format for the uplink including the priority indication, a first transmission on a first PUSCH (e.g., for a first UL-SCH, to which a first UL-SCH is mapped) is performed, a second transmission on a second PUSCH (e.g., for a second UL-SCH, to which a second UL-SCH is mapped) is performed. Additionally or alternatively, the UE 102 may perform, (for example, in a symbol(s) and/or in a slot(s)), a simultaneous transmission of two PUSCHs. For example, the UE 102 may perform, (for example, in a symbol(s) and/or in a slot(s)), the simultaneous transmission of the first PUSCH corresponding to the first UL-SCH and the second PUSCH corresponding to the second UL-SCH.

Additionally or alternatively, in a case that the DCI format 1_0, the DCI format 1_1 and/or the DCI format 1_X is received (e.g., based on the detection of the DCI format 1_0, the DCI format 1_1, the DCI format 1_X), the UE 102 may perform the PDSCH reception. Additionally or alternatively, in a case that the DCI format 0_0, the DCI format 0_1, and/or the DCI format 0_Y is received (e.g., based on the detection of the DCI format 0_0, the DCI format 0_1, and/or the DCI format 0_Y), the UE 102 may perform the PUSCH transmission.

Here, as described above, a RNTI(s) (e.g., a Radio Network Temporary Identifier(s)) assigned to the UE 102 may be used for transmission of DCI (e.g., the DCI format(s), DL control channel(s) (e.g., the PDCCH(s)). Namely, the gNB 160 may transmit, (e.g., by using the RRC message), information used for configuring (e.g., assigning) the RNTI(s) to the UE 102.

For example, CRC (Cyclic Redundancy Check) parity bits (also referred to simply as CRC), which are generated based on DCI, are attached to DCI, and, after attachment, the CRC parity bits are scrambled by the RNTI(s). The UE 102 may attempt to decode (e.g., blind decoding, monitor, detect) DCI to which the CRC parity bits scrambled by the RNTI(s) are attached. For example, the UE 102 detects DL control channel (e.g., the PDCCH, the DCI, the DCI format(s)) based on the blind decoding. That is, the UE 102 may decode the DL control channel(s) with the CRC scrambled by the RNTI(s). In other words, the UE 102 may monitor the DL control channel(s) with the RNTI(s). For example, the UE 102 may detect the DCI format(s) with the RNTI(s).

Here, the RNTI(s) may include the C-RNTI(s) (Cell-RNTI(s)), the CS-RNTI(s) (Configured Scheduling C-RNTI(s)), the SI-RNTI(s) (System Information RNTI(s)), the RA-RNTI(s) (Random Access-RNTI(s)), the Temporary C-RNTI(s), and/or the first RNTI.

For example, the C-RNTI(s) may be a unique identification used for identifying an RRC connection and/or scheduling. Additionally or alternatively, the CS-RNTI(s) may be a unique identification used for scheduling of transmission based on a configured grant. Additionally or alternatively, the SI-RNTI may be used for identifying system information (SI) (e.g., an SI message) mapped on the BCCH and dynamically carried on DL-SCH. Additionally or alternatively, the SI-RNTI may be used for broadcasting of SI. Additionally or alternatively, the RA-RNTI may be an identification used for the random access procedure (e.g., Msg.2 transmission). Additionally or alternatively, the Temporary C-RNTI may be used for the random access procedure (e.g., scheduling of Msg.3 (re)transmission (e.g., Msg.3 PUSCH (re)transmission)).

Here, in the random access procedure (e.g., a contention based random access procedure), the Msg.3 PUSCH transmission (e.g., an initial transmission) may be scheduled by using a random access response grant. For example, in the random access procedure, the random access response grant may be included in the PDSCH (e.g., the Msg.2 transmission). Also, in the random access procedure, the random access response grant may be used for scheduling of the PUSCH for the Msg. 3 transmission. Also, as described above, the PDCCH (i.e., the DCI format 0_0) with the CRC scrambled by the Temporary C-RNTI may be used for scheduling of the PUSCH for the Msg. 3 transmission (e.g., Msg. 3 retransmission).

Additionally or alternatively, as described above, the first RNTI may be an identification used for indicating a priority (e.g. the higher priority, the highest priority, the lower priority, and/or the lowest priority) for the PDSCH transmission and/or the PDSCH reception. Additionally or alternatively, as described above, the first RNTI(s) may be an identification used for indicating a priority (e.g. the higher priority, the highest priority, the lower priority, and/or the lowest priority) for the PUSCH transmission and/or the PUSCH reception.

Additionally or alternatively, a physical downlink shared channel (PDSCH) and a physical uplink shared channel (PUSCH) may be defined. For example, in a case that the PDSCH (e.g., the PDSCH resource) is scheduled by using the DCI format(s) for the downlink, the UE 102 may receive the downlink data, on the scheduled PDSCH (e.g., the PDSCH resource). Additionally or alternatively, in a case that the PUSCH (e.g., the PUSCH resource) is scheduled by using the DCI format(s) for the uplink, the UE 102 transmits the uplink data, on the scheduled PUSCH (e.g., the PUSCH resource). For example, the PDSCH may be used to transmit the downlink data (e.g., DL-SCH(s), a downlink transport block(s)). Additionally or alternatively, the PUSCH may be used to transmit the uplink data (e.g., UL-SCH(s), an uplink transport block(s)).

Furthermore, the PDSCH and/or the PUSCH may be used to transmit information of a higher layer (e.g., a radio resource control (RRC)) layer, and/or a MAC layer). For example, the PDSCH (e.g., from the gNB 160 to the UE 102) and/or the PUSCH (e.g., from the UE 102 to the gNB 160) may be used to transmit a RRC message (a RRC signal). Additionally or alternatively, the PDSCH (e.g., from the gNB 160 to the UE 102) and/or the PUSCH (e.g., from the UE 102 to the gNB 160) may be used to transmit a MAC control element (a MAC CE). Here, the RRC message and/or the MAC CE are also referred to as a higher layer signal.

In some approaches, a physical broadcast channel (PBCH) may be defined. For example, the PBCH may be used for broadcasting the MIB (master information block). Here, system information may be divided into the MIB and a number of SIB(s) (system information block(s)). For example, the MIB may be used for carrying include minimum system information. Additionally or alternatively, the SIB(s) may be used for carrying system information messages.

In some approaches, in downlink, a SS (Synchronization Signal) may be defined. The SS may be used for acquiring time and/or frequency synchronization with a cell. Additionally or alternatively, the SS may be used for detecting a physical layer cell ID of the cell.

In the radio communication for uplink, UL RS(s) may be used as uplink physical signal(s). Additionally or alternatively, in the radio communication for downlink, DL RS(s) may be used as downlink physical signal(s). The uplink physical signal(s) and/or the downlink physical signal(s) may not be used to transmit information that is provided from the higher layer, but is used by a physical layer.

Here, the downlink physical channel(s) and/or the downlink physical signal(s) described herein may be assumed to be included in a downlink signal (e.g., a DL signal(s)) in some implementations for the sake of simple descriptions. Additionally or alternatively, the uplink physical channel(s) and/or the uplink physical signal(s) described herein may be assumed to be included in an uplink signal (i.e. an UL signal(s)) in some implementations for the sake of simple descriptions.

Also, in a carrier aggregation (CA), the gNB 160 and the UE 102 may communicate with each other using one or more serving cells. Here the one or more serving cells may include one primary cell and one or more secondary cells. For example, the gNB 160 may transmit, by using the RRC message, information used for configuring one or more secondary cells to form together with the primary cell a set of serving cells. Namely, the set of serving cells may include one primary cell and one or more secondary cells. Here, the primary cell may be always activated. Also, the gNB 160 may activate one or more secondary cell within the configured secondary cells. Here, in the downlink, a carrier corresponding to the primary cell may be the downlink primary component carrier (i.e., the DL PCC), and a carrier corresponding to a secondary cell may be the downlink secondary component carrier (i.e., the DL SCC). Also, in the uplink, a carrier corresponding to the primary cell may be the uplink primary component carrier (i.e., the UL PCC), and a carrier corresponding to the secondary cell may be the uplink secondary component carrier (i.e., the UL SCC).

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of downlink and/or uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 shows examples of multiple numerologies 201. As shown in FIG. 2, multiple numerologies 201 (e.g., multiple subcarrier spacing) may be supported. For example, µ (e.g., a subcarrier space configuration) and a cyclic prefix (e.g., the µ and the cyclic prefix for a carrier bandwidth part) may be configured by higher layer parameters (e.g., a RRC message) for the downlink and/or the uplink. Here, 15 kHz may be a reference numerology 201. For example, an RE of the reference numerology 201 may be defined with a subcarrier spacing of 15 kHz in a frequency domain and 2048 Ts+CP length (e.g. 160 Ts or 144 Ts) in a time domain, where Ts denotes a baseband sampling time unit defined as 1/(15000*2048) seconds.

Additionally or alternatively, a number of OFDM symbol(s) 203 per slot ($N_{symb}^{slot}$) may be determined based on the µ (e.g., the subcarrier space configuration). Here, for example, a slot configuration 0 (e.g., the number of OFDM symbols 203 per slot may be 14) and/or a slot configuration (e.g., the number of OFDM symbols 203 per slot may be 7) may be defined.

Figure 3:
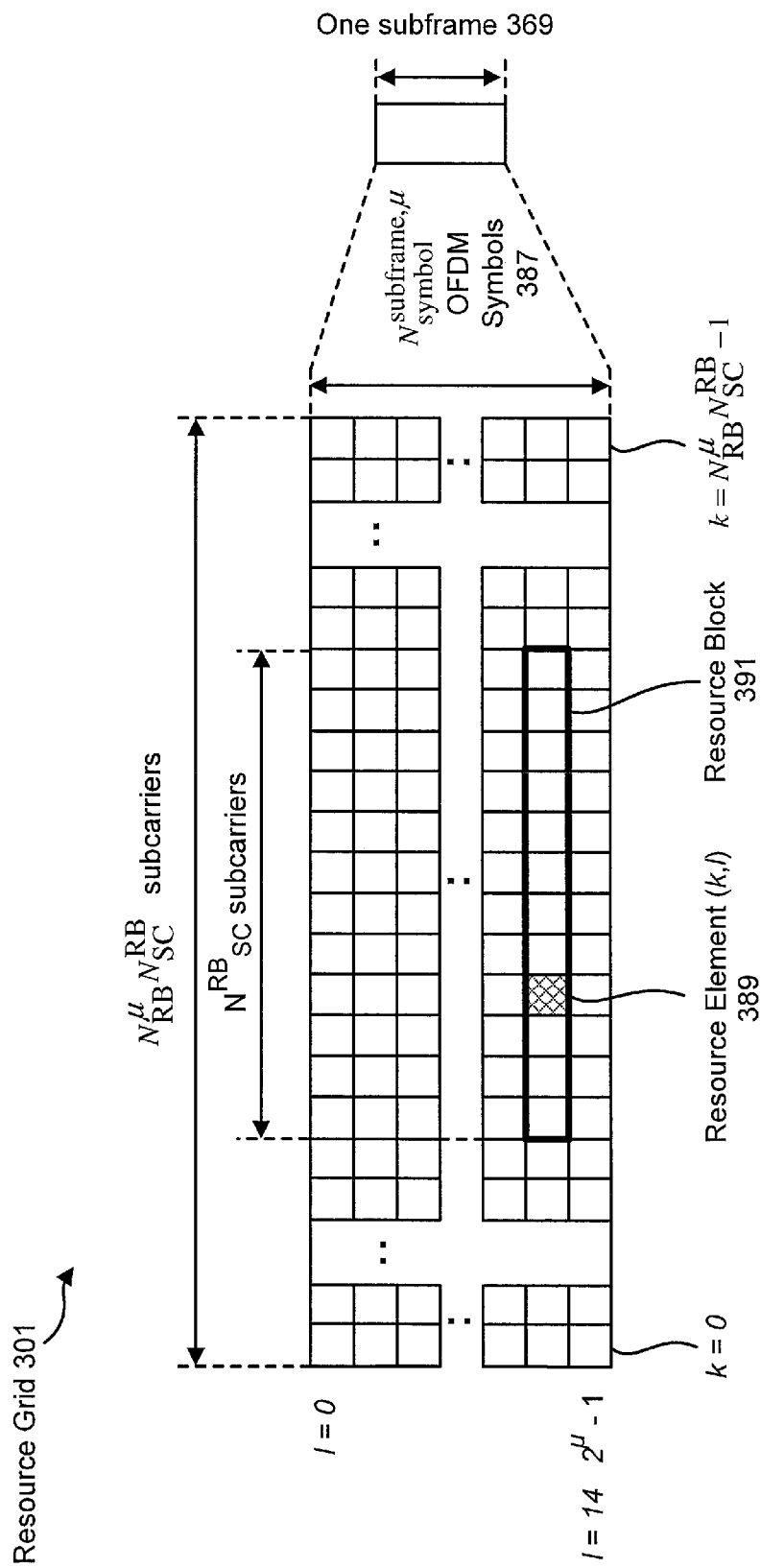
FIG. 3 is a diagram illustrating one example of a resource grid and resource block.

FIG. 3 is a diagram illustrating one example of a resource grid 301 and resource block 391 (e.g., for the downlink and/or the uplink). The resource grid 301 and resource block 391 illustrated in FIG. 3 may be utilized in some implementations of the systems and methods disclosed herein.

In FIG. 3, one subframe 369 may include $N_{symbol}^{subframe,\mu}$ symbols 387. Additionally or symbol alternatively, a resource block 391 may include a number of resource elements (RE) 389. Here, in the downlink, the OFDM access scheme with cyclic prefix (CP) may be employed, which may be also referred to as CP-OFDM. A downlink radio frame may include multiple pairs of downlink resource blocks (RBs) 391 which are also referred to as physical resource blocks (PRBs). The downlink RB pair is a unit for assigning downlink radio resources, defined by a predetermined bandwidth (RB bandwidth) and a time slot. The downlink RB pair may include two downlink RBs 391 that are continuous in the time domain. Additionally or alternatively, the downlink RB 391 may include twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) 389 and is uniquely identified by the index pair (k,l), where k and l are indices in the frequency and time domains, respectively.

Additionally or alternatively, in the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). An uplink radio frame may include multiple pairs of uplink resource blocks 391. The uplink RB pair is a unit for assigning uplink radio resources, defined by a predetermined bandwidth (RB bandwidth) and a time slot. The uplink RB pair may include two uplink RBs 391 that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) 389 and is uniquely identified by the index pair (k,l) in a slot, where k and l are indices in the frequency and time domains respectively.

Each element in the resource grid 301 (e.g., antenna port p) and the subcarrier configuration p is called a resource element 389 and is uniquely identified by the index pair (k,l) where $k=0, \ldots, N_{RB}^{\mu} N_{SC}^{RB}-1$ is the index in the frequency domain and l refers to the symbol position in the time domain. The resource element (k,l) 389 on the antenna port p and the sub-carrier spacing configuration µ is denoted $(k,l)_{p,\mu}$. The physical resource block 391 is defined as $N_{SC}^{RB}=12$ consecutive subcarriers in the frequency domain. The physical resource blocks 391 are numbered from 0 to $N_{RB}^{\mu}-1$ in the frequency domain. The relation between the physical resource block number $n_{PRB}$ in the frequency domain and the resource element (k,l) is given by $$n_{PRB} = \left\lfloor \frac{k}{N_{SC}^{RB}} \right\rfloor.$$

Figure 4:
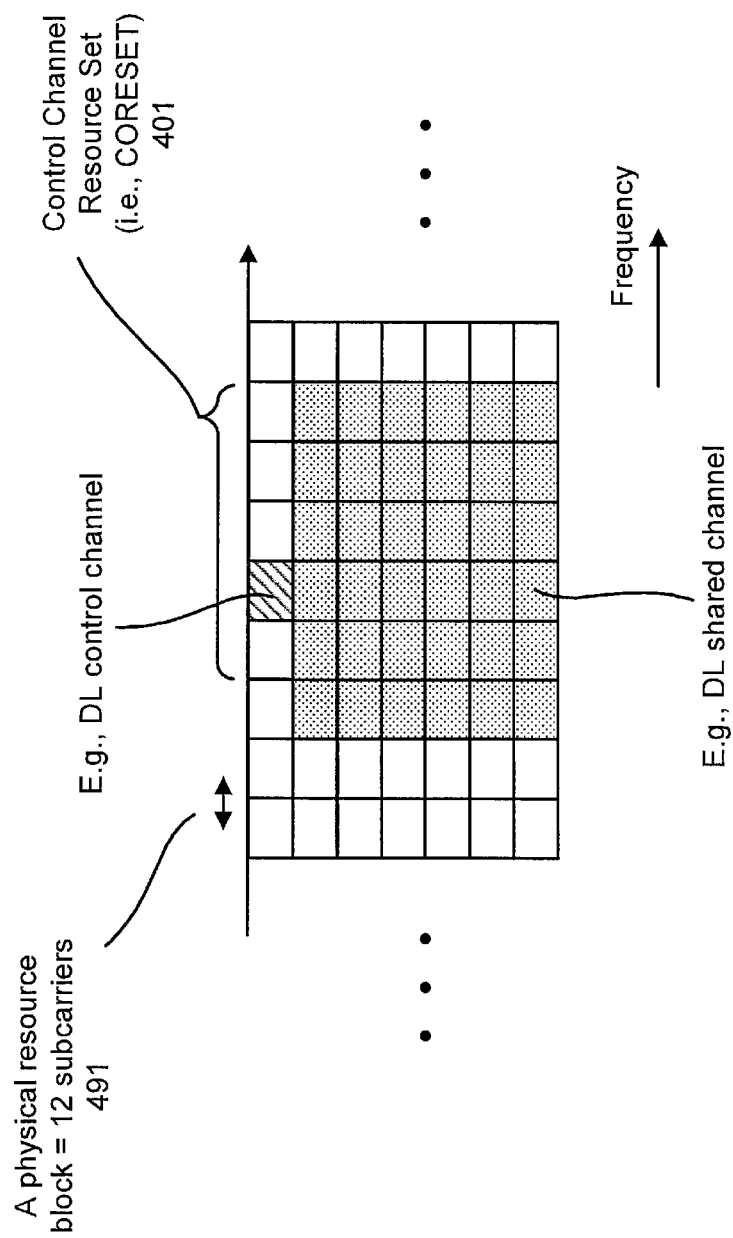
FIG. 4 shows examples of resource regions.

FIG. 4 shows examples of resource regions (e.g., resource region of the downlink). One or more sets 401 of PRB(s) 491 (e.g., a control resource set (e.g., CORESET)) may be configured for DL control channel monitoring (e.g., the PDCCH monitoring). For example, the CORESET is, in the frequency domain and/or the time domain, a set 401 of PRBs 491 within which the UE 102 attempts to decode the DCI (e.g., the DCI format(s), the PDCCH(s)), where the PRBs 491 may or may not be frequency contiguous and/or time contiguous, a UE 102 may be configured with one or more control resource sets (e.g., the CORESETs) and one DCI message may be mapped within one control resource set. In the frequency-domain, a PRB 491 is the resource unit size (which may or may not include DM-RS) for the DL control channel.

The UE 102 may monitor a set of candidates of the PDCCH in one or more control resource sets (e.g., CORE-SETs) on the active DL bandwidth part (BWP) on each activated serving cell according to corresponding search space sets. Here, the term "monitor" may imply that the UE 102 attempts to decode each PDCCH (e.g., the set of candidates of the PDCCH) according to the monitored DCI format(s). Also, the candidates of the PDCCH may be candidates for which the DL control channel(s) may possibly be mapped, assigned, and/or transmitted.

The set of candidates of the PDCCH for the UE 102 to monitor may be defined in terms of a search space set(s) (e.g., also referred to simply as a search space(s)). The UE 102 may monitor the set of candidates of the PDCCH in the search space(s). The search space set(s) may comprise a common search space(s) (CSS(s), UE-common search space(s)) and/or a user equipment-specific search space(s) (USS, UE-specific search space(s)).

Namely, the CSS and/or the USS may be defined (e.g., configured) in a region(s) of DL control channel(s). For example, the CSS may be used for transmission of DCI to a plurality of the UEs 102. For example, a Type0-PDCCH common search space may be defined for the DCI format(s) with CRC scrambled by the SI-RNTI. Additionally or alternatively, a Type1-PDCCH common search space may be defined for the DCI format(s) with CRC scrambled by the RA-RNTI, the Temporary C-RNTI, and/or the C-RNTI. Additionally or alternatively, a Type3-PDCCH common search space may be defined for the DCI format(s) with CRC scrambled by the C-RNTI, and/or the CS-RNTI.

The USS may be used for transmission of DCI to a specific UE 102. For example, the USS may be determined based on a Radio Network Temporary Identifier (RNTI) (e.g., the C-RNTI). For instance, the USS may be defined for the DCI format(s) with CRC scrambled by the C-RNTI, and/or the CS-RNTI.

Here, the gNB 160 may transmit, by using the RRC message, first information used for configuring (e.g., determining) one or more CORESETs. For example, for each of DL BWPs (e.g., each of DL BWPs in the serving cell), the gNB 106 may transmit, by using the RRC message, the first information used for configuring the one or more CORESET. For example, the first information may include information used for configuring an index of the CORESET. Also, the first information may include information used for configuring a number of consecutive symbols for the CORESET. Also, the first information may include information used for configuring a set of resource blocks for the CORESET.

Here, the index "0" of the CORESET (i.e., a value "0" of the CORESET) may be configured by using the MIB and/or the SIB(s). For example, the index "0" of the CORESET may be used for identifying a common CORESET configured in the MIB and/or the SIB(s). Namely, the index of the CORESET except for the value "0" may be configured as the index of the CORESET. Also, the index of the CORESET with the value "0" may be configured by using information of a CORESET-zero. Also, the index "0" of the CORESET may be configured by using a dedicated RRC message (i.e., a UE-specific RRC message, and/or a serving cell-specific RRC message). Namely, the gNB 160 may transmit, by using the MIB, information used for configuring the CORESET with the index "0" (i.e., a CORESET #0). Additionally or alternatively, the gNB 160 may transmit, by using the SIB(s), the information used for configuring the CORESET #0. Additionally or alternatively, the gNB 160 may transmit, by using the dedicated RRC message, the information used for configuring the CORESET #0.

Here, the CORESET #0 may be configured for an initial BWP(s) (e.g., the initial DL BWP(s)). Here, the gNB 160 may transmit, by using the RRC message (e.g., the MIB, the SIB(s), and/or the dedicated RRC message), information used for the initial BWP(s) (e.g., the initial BWP(s)). Also, an index of the initial BWP(s) (e.g., the initial DL BWP(s)) may be "0". Namely, the index "0" (e.g., the value "0") may be applied (e.g., defined) for the initial BWP(s) (e.g., the initial DL BWP(s)). For example, (e.g., for the primary cell), the initial BWP(s) (i.e., the BWP with the index "0") may be the BWP(s) used for an initial access. Additionally or alternately, (e.g., for the secondary cell(s)), the initial BWP(s) (i.e., the BWP(s) with the index "0") may be the BWP(s) configured for the UE to first operate at the secondary cell(s) activation.

Here, the gNB 160 may transmit, by using the RRC message (e.g., the MIB, the SIB(s), and/or the dedicated RRC message), information used for configuring an index of the DL BWP(s) (e.g., the index other than the index "0"). Also, the gNB 160 may transmit, by using the RRC message (e.g., the MIB, the SIB(s), and/or the dedicated RRC message), information used for configuring an index of the UL BWP(s) (e.g., the index other than the index "0").

As described above, the CORESET #0 may be referred to as the common CORESET. Also, the CORESET other than the CORESET #0 may be referred to as a UE-specific CORESET. Namely, the CORESET with the index "X (e.g., X=1, 2, 3, . . . )" other than the index "0" may be referred to as the UE-specific CORESET. For example, the gNB 160 may transmit, by using the dedicated RRC message, information used for configuring the UE-specific CORESET (e.g., the index of the UE-specific CORESET).

Additionally or alternatively, for each of the one or more CORESETs, the search space set(s) (e.g., the set(s) of the CSS(s) and/or the USS(s)) may be configured. For example, the first information may be configured per DL BWP. Namely, the first information may be configured for each of the DL BWPs in the serving cell.

Additionally or alternatively, the gNB 160 may transmit, by using the RRC message, second information used for configuring the search space set(s). For example, the second information may be configured for each search space set. For example, the second information may include information used for configuring an index of the search space set(s). Additionally or alternatively, the second information may include information used for configuring the index of the CORESET(s) associated with the search space set(s). Additionally or alternatively, the second information may include information used for indicating a PDCCH monitoring periodicity and/or a PDCCH monitoring offset where the UE 102 monitors the PDCCH(s) in the search space set(s). Additionally or alternatively, the second information may include information used for indicating a PDCCH monitoring pattern within a slot. For example, the information used for indicating the PDCCH monitoring pattern may be used for indicating first symbol(s) within a slot for the PDCCH monitoring. For instance, the UE 102 may determine a PDCCH monitoring occasion(s) based on the PDCCH monitoring periodicity, the PDCCH monitoring offset, and/or the PDCCH monitoring pattern within a slot.

Additionally or alternatively, the second information may include information used for indicating a type of the search space set (e.g., information used for indicating that the search space set is either the CSS or the USS). Additionally or alternatively, the second information may include information used for indicating one or more DCI formats which accordingly the UE 102 monitors the PDCCH in the search space set(s). For example, if the search space set is the CSS (e.g., if the search space set is configured as the CSS), the DCI format 0_0 and/or the DCI format 1_0 may be configured to monitor the PDCCH (e.g., the candidate(s) of the PDCCH(s)). Here, the DCI format(s) for monitoring the PDCCH in the CSS may be scrambled by the C-RNTI, the CS-RNTI, the RA-RNTI, the Temporary C-RNTI, the SI-RNTI, and/or the first RNTI.

Additionally or alternatively, if the search space set is the USS (e.g., if the search space set is configured as the USS), the DCI format 0_0, the DCI format 1_0, the DCI format 0_Y, and/or the DCI format 1_X may be configured to monitor the PDCCH (e.g., the candidate(s) of the PDCCH(s)). Additionally or alternatively, if the search space set is the USS, the DCI format 0_1, the DCI format 1_1, the DCI format 0_Y, and/or the DCI format 1_X may be configured to monitor the PDCCH (e.g., the candidate(s) of the PDCCH(s)). For example, if the search space set is the USS, either of a first set of DCI formats (e.g., the DCI format 0_0, the DCI format 1_0, and/or the DCI format 0_Y, and/or the DCI format 1_X) or a second set of DCI formats (e.g., the DCI format 0_1, the DCI format 1_1, the DCI format 0_Y, and/or the DCI format 1_X) may be configured to monitor the PDCCH (e.g., the candidate(s) of the PDCCH(s)). Here, the DCI format(s) for monitoring the PDCCH in the USS may be scrambled by the C-RNTI, the CS-RNTI, and/or the first RNTI. For example, the second information may be configured per search space set. Namely, the second information may be configured for each of search space sets.

Here, the index "0" of the search space set (i.e., a value "0" of the search space set) may be configured by using the MIB and/or the SIB(s). For example, the index "0" of the search space set may be used for identifying a common search space set configured in the MIB and/or the SIB(s). Namely, the index of the search space set except for the value "0" may be configured as the index of the search space. Also, the index of the search space set with the value "0" may be configured by using information of search space-zero. Also, the index "0" of the search space set may be configured by using a dedicated RRC message (i.e., a UE-specific RRC message, and/or a serving cell-specific RRC message). Namely, the gNB 160 may transmit, by using the MIB, information used for configuring the search space set with the index "0" (i.e., the search space set #0). Additionally or alternatively, the gNB 160 may transmit, by using the SIB(s), the information used for configuring the search space set #0. Additionally or alternatively, the gNB 160 may transmit, by using the dedicated RRC message, the information used for configuring the search space set #0. Here, the search space set #0 may be configured for the initial BWP(s) (e.g., the initial DL BWP(s)).

As described above, the search space set #0 may be referred to as the common search space set. Also, the search space set other than the search space set #0 may be referred to as a UE-specific search space set. Namely, the search space set with the index "X (e.g., X=1, 2, 3, ... )" other than the index "0" may be referred to as the UE-specific search space set. For example, the gNB 160 may transmit, by using the dedicated RRC message, information used for configuring the UE-specific search space set (e.g., the index of the UE-specific search space set).

Here, for example, for the serving cell(s), the gNB 160 may configure, by using the RRC message, a set of four DL BWPs (e.g., at most four DL BWPs, a DL BWP set) (e.g., for receptions by the UE 102). Additionally or alternatively, the gNB 160 may indicate, by using the DCI format(s) for the downlink, an active DL BWP(s). For example, for each DL BWP in the set of DL BWPs, the gNB 160 may configure, by using the RRC message, the subcarrier spacing, the cyclic prefix, a number of contiguous PRBs 491 (e.g., a bandwidth of PRBs), and/or an index (e.g., the index of the DL BWP(s)) in the set of DL BWPs.

Additionally or alternatively, for the serving cell(s), the gNB 160 may configure, by using the RRC message, a set of four UL BWP(s) (e.g., at most four UL BWPs, a UL BWP set) (e.g., for transmissions by the UE 102). Additionally or alternatively, the gNB 160 may indicate, by using the DCI format(s) for the uplink, an active UL BWP(s). Additionally or alternatively, for each UL BWP in the set of UL BWPs, the gNB 160 may configure, by using the RRC message, the subcarrier spacing, the cyclic prefix, a number of contiguous PRBs 491 (e.g., a bandwidth of PRBs), an index (e.g., the index of the UL BWP(s)) in the set of UL BWPs.

Additionally or alternatively, the UE 102 may perform, based on the configuration(s) for the DL BWP(s), reception(s) on the PDCCH in the DL BWP(s) and/or reception(s) on the PDSCH in the DL BWP(s). Additionally or alternatively, the UE 102 may perform, based on the configuration(s) for the UL BWP(s).

Figure 5:
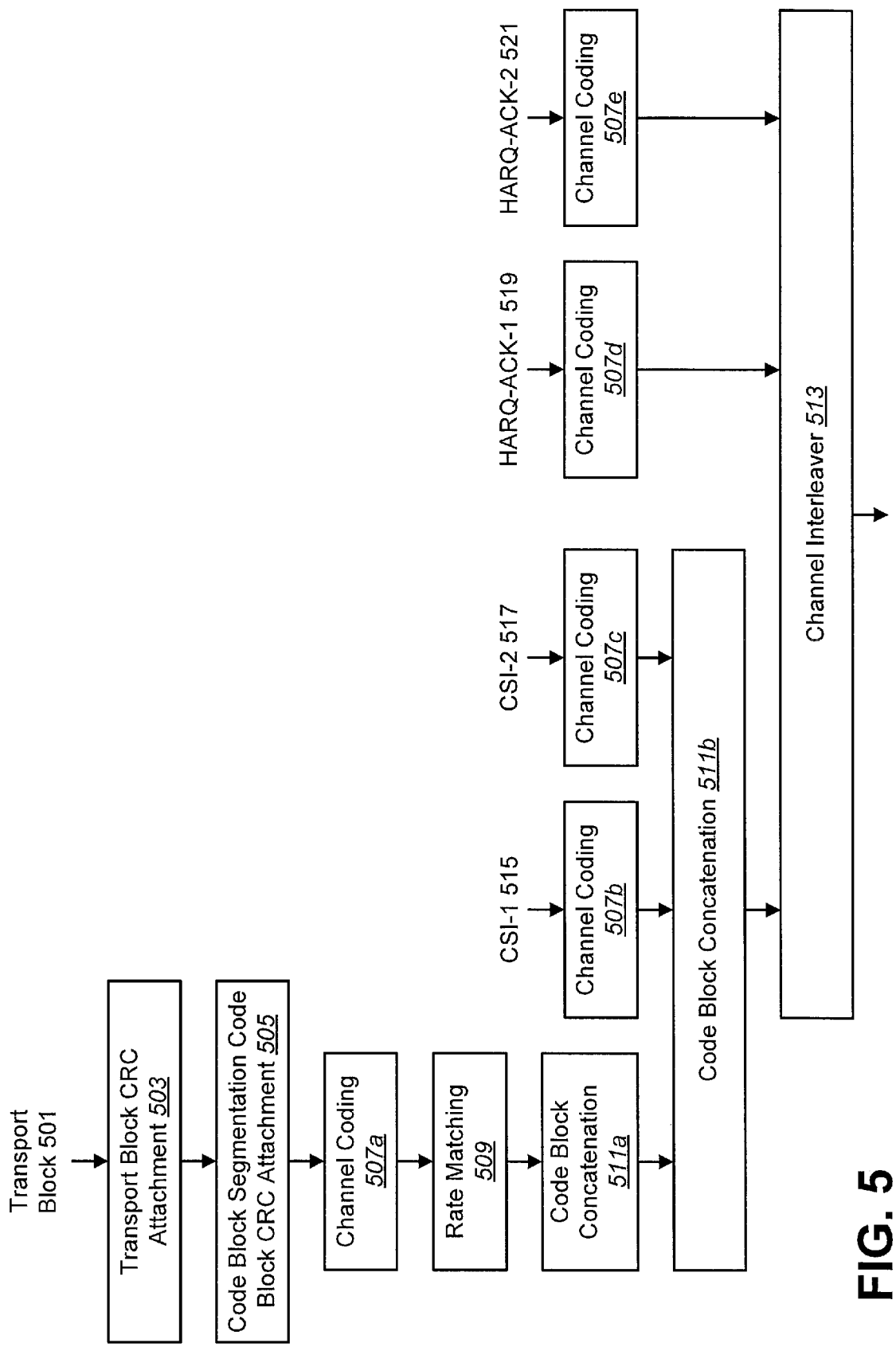
FIG. 5 illustrates an example of uplink transmissions.

FIG. 5 illustrates an example of uplink transmissions. As shown by FIG. 5, the processing (e.g., the processing structure) for the UL-SCH transport channel on one UL cell may be performed. Here, the UL-SCH (e.g., the uplink data) may be mapped to the PUSCH (e.g., a resource(s) (i.e., a resource element(s)) of the PUSCH). Additionally or alternatively, the UCI (i.e., the HARQ-ACK, the CSI, and/or the SR) may be mapped to the PUSCH (e.g., a resource(s) (i.e., a resource element(s)) of the PUSCH). Here, the CSI report(s) may include aperiodic CSI report(s), semi-persistent CSI report(s), and/or periodic CSI report(s). Additionally or alternatively, the CSI report(s) may include CSI part 1 report(s), CSI part 2 report(s), CQI (e.g., Channel Quality information) report(s), PMI (e.g., Precoding Matrix Information) report(s), and/or RI (e.g., Rank Indication) report(s).

For example, if the UE 102 would have on a serving cell the PUSCH transmission without the UL-SCH that overlaps with the PUSCH transmission on the serving cell that includes the UCI (e.g., the HARQ-ACK(s) and/or positive SR information), the UE 120 may not perform the PUSCH transmission. Additionally or alternatively, if the UE 102 would have on a serving cell the PUSCH transmission without the UL-SCH that overlaps with the PUSCH transmission on the serving cell that includes CSI reports (e.g., semi-persistent CSI reports), the UE 102 may not perform the PUSCH with the CSI reports (e.g., the semi-persistent CSI reports). If the UE 102 has (e.g., would have) the PUSCH transmission with the UL-SCH that overlaps with the PUCCH transmission that includes the UCI (e.g., the HARQ-ACK(s), the semi-persistent CSI information, and/or the periodic CSI information), the UE 102 may multiplex the UCI (e.g., the HARQ-ACK(s), the semi-persistent CSI information, and/or the periodic CSI information) on the PUSCH.

For example, in a case that the PUSCH transmission overlaps with the PUCCH transmission that includes the UCI (e.g., the HARQ-ACK and/or the CSI) in the same timing (e.g., in the same slot and/or in the symbol), the UE 102 may multiplex the UL-SCH (e.g., the uplink data) and the UCI (e.g., the HARQ-ACK(s) and/or the CSI) on the PUSCH. For example, the UE 102 may transmit, in the same timing (e.g., in the same slot and/or in the same symbol), the UL-SCH together with the UCI (e.g., the HARQ-ACK(s) and/or the CSI) on the PUSCH.

Here, the HARQ-ACK(s) may include one or more HARQ-ACKs. Namely, the HARQ-ACK(s) may include one or more HARQ-ACK codebooks (e.g., the two HARQ-ACK codebooks, as described above). For example, the HARQ-ACK(s) may include one or more HARQ-ACKs for one or more PDSCHs (e.g., PDSCH transmissions).

For example, HARQ-ACK-1 519 (i.e., a first HARQ-ACK codebook) for one or more PDSCHs and HARQ-ACK-2 521 (i.e., a second HARQ-ACK codebook) for one or more PDSCHs may be transmitted (e.g., simultaneously transmitted, as described above) on the single PUSCH resource (e.g., mapped to the single same PUSCH resource). Additionally or alternatively, the HARQ-ACK-1 519 and the HARQ-ACK-2 521 may be independently (e.g., respectively) coded, and mapped to the PUSCH resource. For example, the number of resources (e.g., the number of resource elements, the number of coded symbols, and/or the number of coded modulation symbol(s)) for the HARQ-ACK-1 519 may be dynamically changed on the PUSCH (e.g., the PUSCH resource). Additionally or alternatively, the number of resources (e.g., the number of resource elements, the number of coded symbols, and/or the number of coded modulation symbol(s)) for the HARQ-ACK-2 521 may be dynamically changed on the PUSCH (e.g., the PUSCH resource). Additionally or alternatively, the number of resources for the HARQ-ACK-1 519 and the number of resources for the HARQ-ACK-2 521 may be respectively changed on the PUSCH (e.g., the PUSCH resource). For example, the number of resources for the HARQ-ACK-1 519 and the number of resources for the HARQ-ACK-2 521 may be respectively changed based on the configuration(s) (e.g., the RRC configuration) and/or the indication (e.g., the DCI indication).

Additionally or alternatively, the CSI(s) may include one or more CSIs. Namely, the CSI(s) may include one or more CSI reports (e.g., two CSI reports). For example, the CSI(s) may include one or more CSIs for one or more PDSCHs (e.g., PDSCH transmissions). For example, CSI-1 515 (i.e., a first CSI report) for one or more PDSCHs and CSI-2 517 (i.e., a second CSI report) for one or more PDSCHs may be transmitted (e.g., simultaneously transmitted) on the single PUSCH resource (e.g., mapped to the single PUSCH resource (e.g., mapped to the single same PUSCH resource). Additionally or alternatively, the CSI-1 515 and the CSI-2 517 may be independently (e.g., respectively) coded, and mapped to the PUSCH resource. For example, the number of resources (e.g., the number of resource elements, the number of coded symbols, and/or the number of coded modulation symbol(s)) for the CSI-1 515 may be dynamically changed on the PUSCH (e.g., the PUSCH resource). Additionally or alternatively, the number of resources (e.g., the number of resource elements, the number of coded symbols, and/or the number of coded modulation symbols) for the CSI-2 517 may be dynamically changed on the PUSCH (e.g., the PUSCH resource). Additionally or alternatively, the number of resources for the CSI-1 515 and the number of resources for the CSI-2 517 may be respectively changed on the PUSCH (e.g., the PUSCH resource). For example, the number of resources for the CSI-1 515 and the number of resources for the CSI-2 517 may be respectively changed based on the configuration(s) (e.g., the RRC configuration) and/or the indication (e.g., the DCI indication).

One or more of the following descriptions may be referred to for FIG. 5. For an uplink shared channel, FIG. 5 shows the processing structure for the UL-SCH transport channel on one UL cell. Data arrives to the coding unit in the form of a maximum of two transport blocks every transmission time interval (TTI) per UL cell. The following coding steps can be identified for each transport block 501 of an UL cell:

Add 503 CRC to the transport block 501;
Code block segmentation and code block CRC attachment 505;
Channel coding 507a-e of data and control information;
Rate matching 509;
Code block concatenation 511a-b;
Multiplexing of data and control information;
Channel interleaver 513.

An example of transport block CRC attachment is described as follows. Error detection is provided on each UL-SCH transport block through a Cyclic Redundancy Check (CRC). The entire transport block is used to calculate the CRC parity bits. Denote the bits in a transport block delivered to layer 1 by $\alpha_0, \alpha_1, \alpha_2, \alpha_3, \ldots, \alpha_{A-1}$, and the parity bits by $p_0, p_1, p_2, p_3, \ldots, p_{L-1}$. A is the size of the transport block and L is the number of parity bits. The lowest order information bit $\alpha_0$ is mapped to the most significant bit of the transport block. The parity bits are computed and attached to the UL-SCH transport block. An example of code block segmentation and code block CRC attachment is described as follows. The bits input to the code block segmentation are denoted by $b_0, b_1, b_2, b_3, \ldots, b_{B-1}$ where B is the number of bits in the transport block (including CRC). Additionally or alternatively, code block segmentation and code block CRC attachment are performed. The bits after code block segmentation are denoted by $c_{r0}, c_{r1}, c_{r2}, c_{r3}, \ldots, c_{r(K_r-1)}$, where r is the code block number and $K_r$ is the number of bits for code block number r.

An example of channel coding of UL-SCH is given as follows. Code blocks are delivered to the channel coding block. The bits in a code block are denoted by $c_{r0}, c_{r1}, c_{r2}, c_{r3}, \ldots, c_{r(K_r-1)}$, where r is the code block number, and $K_r$ is the number of bits in code block number r. The total number of code blocks is denoted by C and each code block is individually encoded. After encoding the bits are denoted by $d_{r0}^{(i)}, d_{r1}^{(i)}, d_{r2}^{(i)}, d_{r3}^{(i)}, \ldots, d_{r(D_r-1)}^{(i)}$, (with i=0, 1, and 2 and where $D_r$ is the number of bits on the i-th coded stream for code block number r, e.g., $D_r = K_r + 4$.

An example of rate matching is given as follows. Coded blocks are delivered to the rate matching block. They are denoted by $d_{r0}^{(i)}, d_{r1}^{(i)}, d_{r2}^{(i)}, d_{r3}^{(i)}, \ldots, d_{r(D_r-1)}^{(i)}$, with i=0, 1, and 2, and where r is the code block number, i is the coded stream index, and $D_r$ is the number of bits in each coded stream of code block number r. The total number of code blocks is denoted by C and each coded block is individually rate matched. After rate matching, the bits are denoted by $e_{r0}, e_{r1}, e_{r2}, e_{r3}, \ldots, e_{r(E_r-1)}$, where r is the coded block number, and where $E_r$ is the number of rate matched bits for code block number r. An example of code block concatenation is given as follows. The bits input to the code block concatenation block are denoted by $e_{r0}, e_{r1}, e_{r2}, e_{r3}, \ldots, e_{r(E_r-1)}$ for r=0, . . . , C−1 and where $E_r$ is the number of rate matched bits for the r-th code block. Additionally or alternatively, code block concatenation is performed. The bits after code block concatenation are denoted by $f_0, f_1, f_2, f_3, \ldots, f_{G-1}$, where G is the total number of coded bits for transmission of the given transport block over $N_L$ transmission layers excluding the bits used for control transmission, when control information is multiplexed with the UL-SCH transmission.

An example of channel coding of control information is given as follows. For example, the UCI (i.e., control data) arrives at the coding unit in the form of the CSI(s) (e.g., the CSI-1 515, and/or the CSI-2 517), and/or the HARQ-ACK(s) (e.g., the HARQ-ACK-1 519, and/or the HARQ-ACK-2 521). Additionally or alternatively, different coding rates for the UCIs (e.g., the CSI-1 515, the CSI-2 517, the HARQ-ACK-1 519, and/or the HARQ-ACK-2 521, respectively) are achieved by allocating different number of resources (e.g., different number of resources for multiplexing each of the UCIs on the PUSCH). For example, in a case that the UCIs are transmitted on the PUSCH, the channel coding(s) for the HARQ-ACK1, the HARQ-ACK2, the CSI-1 515, and/or the CSI-2 517 is performed independently.

For example, in a case that the UE transmits the HARQ-ACK(s) (e.g., the HARQ-ACK-1 519 (e.g., the HARQ-ACK-1 bits) and/or the HARQ-ACK-2 521 (e.g., the HARQ-ACK-2 bits)), the number of resources for the HARQ-ACK(s) (e.g., the HARQ-ACK-1 519 and/or the HARQ-ACK-2 521, respectively) may be determined as follows.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad (1)$$

In Equation (1):
O is the number of the HARQ-ACK bits (e.g., the HARQ-ACK-1 bits and/or the HARQ-ACK-2 bits, respectively);
$M_{sc}^{PUSCH}$ is the scheduled bandwidth for the PUSCH transmission in the current timing (e.g., in a slot and/or in a symbol) for the transport block, expressed as the number of subcarriers and/or the subcarrier spacing;
$N_{symb}^{PUSCH}$-initial is the number of SC-FDMA symbols per slot for initial PUSCH transmission;
$M_{sc}^{PUSCH-initial}$, C, and $K_r$ are obtained from the initial PDCCH. For example, $M_{sc}^{PUSCH-initial}$ may be given by the frequency resource allocation field (e.g., DCI) included in the DCI format(s) for the uplink;
for HARQ-ACK(s) transmission, $\beta_{offset}^{PUSCH}=\beta_{offset}^{HARQ-ACK}$ (e.g., an offset value(s) for the HARQ-ACK(s)) as described herein. Here, $\beta_{offset}^{CSI-1}$ and $\beta_{offset}^{CSI-2}$ described herein may be assumed to be included the offset value(s) for the HARQ-ACK(s) in some implementations for the sake of simplifying description.

Additionally or alternatively, for the CSI(s) (e.g., the CSI-1 515 and/or the CSI-2 517, respectively), in a case that the UE transmits the CSI(s) (e.g., the CSI-1 515 (e.g., the CSI-1 bits) and/or the CSI-2 517 (e.g., the CSI-2 bits), respectively), the number of resources for the CSI(s) may be determined as follows.

$$Q' = \min\left(\left\lceil \frac{O \cdot M_{sc}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}} \right\rceil, \right.$$
$$\left. M_{sc}^{PUSCH} \cdot N_{symb}^{PUSCH} - \frac{Q_{RI}^{(x)}}{Q_m^{(x)}}\right) \quad (2)$$

In Equation (2):
O is the number of the CQI bits (e.g., the CSI-1 bits and/or the CSI-2 bits, respectively) and/or the PMI bits;

L is the number of CRC bits given by $$L = \begin{cases} 0 & O \le 11 \\ 8 & \text{otherwise} \end{cases};$$

$M_{sc}^{PUSCH}$ is the scheduled bandwidth for the PUSCH transmission in the current timing (e.g., in a slot and/or in a symbol) for the transport block, expressed as the number of subcarriers and/or the subcarrier spacing;
$Q_{CQI}=Q_m^{(x)} \cdot Q'$. $Q_m$ may be a modulation scheme indicated by using the DCI format for the uplink;
$M_{sc}^{PUSCH-initial(x)}$, $C^{(x)}$, and $K_r^{(x)}$ are obtained from the initial PDCCH. For example, $M_{sc}^{PUSCH-initial(x)}$, $C^{(x)}$, and $K_r^{(x)}$ may be given by the frequency resource allocation field (e.g., DCI) included in the DCI format(s) for the uplink; and
$N_{symb}^{PUSCH-initial(x)}$ is the number of symbols per slot for initial PUSCH transmission.
For the CSI(s), $\beta_{offset}^{PUSCH}=\beta_{offset}^{CQI}$ (e.g., an offset value(s) for the CSI(s)) as described herein. Here, for example, $\beta_{offset}^{PUSCH}=\beta_{offset}^{CQI}$ which may be determined based on $\beta_{offset}^{CSI-1}$ and $\beta_{offset}^{CSI-2}$. Here $\beta_{offset}^{CSI-1}$ and $\beta_{offset}^{CSI-2}$ described herein may be assumed to be included the offset value(s) for the CSI(s) in some implementations for the sake of simplifying description.

For example, the number of resources for the HARQ-ACK-1 519 and the number of resources for the HARQ-ACK-2 521 may be determined, respectively, based on Equation (1) above. Additionally or alternatively, the number of resources for the CSI-1 515 and the number of resources for the CSI-2 517 may be determined, respectively, based on Equation (2) above. For example, the HARQ-ACK-1 519 and the HARQ-ACK-2 521 may be transmitted with different reliabilities on the PUSCH (e.g., the PUSCH resource). Additionally or alternatively, CQI-1 and CQI-2 may be transmitted with different reliabilities on the PUSCH (e.g., the PUSCH resource).

Namely, the offset value(s) for the HARQ-ACK(s) may be defined (e.g., configured and/or indicated) to determine the number of resources for the HARQ-ACK(s) transmitted (e.g., transmitted together with the UL-SCH(s)) on the PUSCH(s). Also, an offset value(s) for the CSI(s) may be defined (e.g., configured and/or indicated) to determine the number of resources for the CSI(s) transmitted (e.g., transmitted together with the UL-SCH(s)) on the PUSCH(s)

Additionally or alternately, the gNB 160 may transmit, by using the RRC message, third information used for configuring the offset value(s) (e.g., the offset value(s) for the HARQ-ACK(s) and/or the offset value(s) for the CSI(s)). Additionally or alternatively, the gNB 160 may transmit, the DCI format(s) (e.g., the DCI format(s) for the uplink) including the DCI (i.e., the beta-offset indicator) used for indicating the offset value(s) (e.g., the offset value(s) for the HARQ-ACK(s) and/or the offset value(s) the CSI(s)). Additionally or alternatively, the gNB 160 may transmit, by using the RRC message, fourth information (e.g., the fourth information may be the third information) used for configuring more than one offset values (e.g., four offset values for the HARQ-ACK(s) and/or four offset value(s) for the CSI(s)). Additionally or alternatively, the gNB 160 may transmit, the DCI format(s) (e.g., the DCI format(s) for the uplink) including the DCI (i.e., the beta-offset indicator) used for indicating an offset value (e.g., an offset value(s) for the HARQ-ACK(s) and/or an offset value(s) for the CSI(s)) among from the more than one values (e.g., the four offset values for the HARQ-ACK(s) and/or the four offset value(s)

for the CSI(s)). Namely, the beta-offset indicator included in the DCI format(s) (e.g., the DCI format(s) for the uplink) may be used for indicating the offset value(s) (e.g., the offset value(s) for the HARQ-ACK(s) and/or the offset value(s) for the CSI(s)) to determine the number of resources (e.g., for the HARQ-ACK(s) and/or the CSI(s)).

FIG. 6 illustrates examples of an indication for UL transmission. As described herein, the offset value(s) (e.g., the offset value(s) for the HARQ-ACK(s) and/or the offset value(s) for the CSI(s)) may be defined (e.g., configured, and/or indicated) to determine the number of resources (e.g., the number of PUSCH resource used for the HARQ-ACK(s) and/or the CSI(s)). Namely, the UE 102 may determine, based on the offset value(s) for the HARQ-ACK(s), the number of resources for the HARQ-ACK(s) transmitted (e.g., transmitted together with the UL-SCH(s)) on the PUSCH(s). Additionally or alternatively, the UE 102 may determine, based on the offset value(s) for the CSI(s), the number of resources for the CSI(s) transmitted (e.g., transmitted together with the UL-SCH(s)) on the PUSCH(s). Here, one or more offset values for one or more HARQ-ACKs may be defined to determine the number of resource for one or more HARQ-ACKs, respectively. Additionally or alternatively, one or more offset values for one or more CSIs may be defined to determine the number of resources for one or more CSIs, respectively.

Here, the second DCI format(s) 603 may be the DCI format 1_X and/or the DCI format 0_Y. Additionally, the second DCI format(s) 603 may be the DCI format(s) (e.g., the DCI format 1_1, the DCI format 1_X, the DCI format 0_1, and/or the DCI format 0_Y) with the CRC scrambled by the first RNTI. Additionally, the second DCI format(s) 603 may be the DCI format(s) (e.g., the DCI format 1_1, the DCI format 1_X, the DCI format 0_0, and/or the DCI format 0_Y) detected in the CORESET(s) configured by the gNB 160. Namely, the gNB 160 may transmit, by using the RRC message, fifth information used for configuring the CORESET(s) corresponding to the second DCI format(s) 603. Namely, in a case that the UE 102 detects the DCI format(s) in the CORESET(s) configured by using the fifth information, the UE 102 may recognize the detected DCI format(s) as the second DCI format(s) 603. Here, the gNB 160 may configure the fifth information for the CORESET(s) except for the CORESET #0. Additionally or alternatively, the second DCI format(s) 603 may be the DCI format(s) (e.g., the DCI format 1_0, the DCI format 1_1, the DCI format 1_X, the DCI format 0_0, the DCI format 0_1, and/or the DCI format 0_Y) detected in the search space set(s) configured by the gNB 160. Namely, the gNB 160 may transmit, by using the RRC message, sixth information used for configuring the search space set(s) corresponding to the second DCI format(s) 603. Namely, in a case that the UE 102 detects the DCI format(s) in the search space set(s) configured by using the sixth information, the UE 102 may recognize the detected DCI format(s) as the first DCI format(s) 601. Here, the gNB 160 may configure the sixth information for the search space set(s) except for the search space set #0.

Here, as described above, the DCI format 0_1 (i.e., the first DCI format 601) may include, at least, the beta-offset indicator. Also, the DCI format 0_1 (i.e., the first DCI format 601) may include, at least, the UL-SCH indicator. Here, for the first DCI format 601, a field(s) for the beta-offset indicator and a field(s) for the UL-SCH indicator may be separately defined. For example, the number of bits for the beta-offset indicator included in the first DCI format 601 may be 0-bit or 2-bit. For example, the gNB 160 may transmit, by using the RRC message, seventh information used for determining (e.g., configuring) the number of bits (e.g., 0-bit or 2-bit) for the beta-offset indicator. Also, for example, the UL-SCH indicator included in the first DCI format 601 may be always 1-bit.

For example, as described above, a value(s) of "01", "10", and/or "11" (e.g., the value(s) of 2-bit field of the beta-offset indicator included in the first DCI format 601) may be used for indicating the offset value among from the more than one values configured, by the gNB 160, by using the RRC message. And, the UE 102 may use the indicated offset value to determine the number of resources for the UCI(s) (e.g., the HARQ-ACK(s) and/or the CSI(s)). Here, in a case that the beta-offset indicator is not configured for the first DCI format 601 (e.g., in a case that the number of bits for the beta-offset indicator is configured to "0-bit", in a case that the beta-offset indicator is absent in the first DCI format 601), the offset value(s) configured, by the gNB 160, by using the RRC message (e.g., the offset value(s) configured by using the third information as described above) may be used. Namely, in a case that the beta-offset indicator is not configured for the first DCI format 601, the UE 102 may use the configured offset value (e.g., the offset value(s) configured by using the third information) to determine the number of resources for the UCI(s) (e.g., the HARQ-ACK(s) and/or the CSI(s)).

Additionally or alternatively, a value of "0" (e.g., the value of 1-bit field of the UL-SCH indicator included in the first DCI format 601) may be used for indicating the UL-SCH is not transmitted on the PUSCH (e.g., the UL-SCH shall not be transmitted on the PUSCH). Also, a value of "1" (e.g., the value of 1-bit field of the UL-SCH indicator included in the first DCI format 601) may be used for indicating the UL-SCH is transmitted on the PUSCH (e.g., the UL-SCH shall be transmitted on the PUSCH).

Namely, the UL-SCH indicator included in the first DCI format 601 may be used for indicating whether or not the UL-SCH is transmitted on the PUSCH. For example, in a case that the first DCI format 601 including the UL-SCH indicator set to "1" (i.e., the value of 1-bit field of the UL-SCH indicator is set to "1") is received, the UE 102 may transmit the UL-SCH together with the UCI (e.g., the HARQ-ACK(s) and/or the CSI(s)) on the PUSCH. Also, in a case that the first DCI format 601 including the UL-SCH indicator set to "0" (i.e., the value of 1-bit field of the UL-SCH indicator is set to "0") is received, the UE 102 may transmit the UCI(s) (e.g., the HARQ-ACK(s) and/or the CSI(s)) on the PUSCH. Namely, in a case that the UL-SCH indicator is set to "0", only the UCI(s) is transmitted (e.g., the UCI is transmitted without the UL-SCH) on the PUSCH.

Additionally or alternatively, the second DCI format(s) 603 may not include the beta-offset indicator. Namely, the beta-offset indicator may be always absent in the second DCI format(s) 603. Here, the second DCI format(s) 603 may include, at least, the UL-SCH indicator. For example, the number of bits for the UL-SCH indicator included in the second DCI format 603 may be 0-bit, 1-bit or 2-bit. For example, the gNB 160 may transmit, by using the RRC message, eighth information used for determining (e.g., configuring) the number of bits (e.g., 0-bit, 1-bit or 2-bit) for the UL-SCH indicator.

Here, for the second DCI format(s) 603, a value of a field(s) for the UL-SCH indicator (e.g., a value(s) of 2-bit field for the UL-SCH indicator) may be used for indicating the UCI(s) (e.g., the HARQ-ACK(s) and/or the CSI(s)) is not transmitted on the PUSCH (e.g., the UCI(s) (e.g., the HARQ-ACK(s) and/or the CSI(s)) shall not be transmitted on the PUSCH). Additionally or alternately, for the second DCI format(s) 603, a value of a field(s) for the UL-SCH indicator (e.g., a value(s) of 2-bit field for the UL-SCH indicator) may be used for indicating the UCI(s) (e.g., the HARQ-ACK(s) and/or the CSI(s)) is transmitted on the PUSCH (e.g., the UCI(s) (e.g., the HARQ-ACK and/or CSI(s)) shall be transmitted on the PUSCH). Namely, the UL-SCH indicator included in the second DCI format 603 may be used for indicating whether or not the UCI(s) is transmitted on the PUSCH. For example, in a case that the number of bits for the UL-SCH indicator is configured to "2-bit" (i.e., more than one bits), the UL-SCH indicator (e.g., the field(s) of the UL-SCH indicator) may be used for indicating whether or not the UCI(s) is transmitted on the PUSCH.

Additionally or alternately, for the second DCI format(s) 603, a value(s) of a field(s) for the UL-SCH indicator (e.g., a value(s) of 2-bit field for the UL-SCH indicator) may be used for indicating a value(s) (e.g., an offset value(s)) to determine the number of resources for the UCI(s) (e.g., the HARQ-ACK(s) and/or the CSI(s)). Namely, for the second DCI format(s) 603, a value(s) of a field(s) for the UL-SCH indicator (e.g., a value(s) of 2-bit field for the UL-SCH indicator) may be used for the offset value (e.g., one offset value) among from more than one offset value(s) configured, by the gNB 160, by using the RRC message. Namely, the gNB 160 may transmit, by using the RRC message, ninth information (e.g., the ninth information may be the third information) used for configuring the more than one offset values. And, the gNB 160 may indicate, by using the value(s) of the field for the UL-SCH indicator included in the second DCI format(s) 603, the offset value (e.g., the one offset value) among from the more than offset values configured by using the ninth information.

For example, a value of "00" (e.g., the value of 2-bit field for the UL-SCH indicator included in the second DCI format(s) 603) may be used for indicating the UCI(s) (e.g., the HARQ-ACK(s) and/or the CSI(s)) is not transmitted on the PUSCH (e.g., the UCI(s) (e.g., the HARQ-ACK(s) and/or the CSI(s) shall not be transmitted on the PUSCH)). Namely, in a case that the second DCI format(s) 603 including the UL-SCH indicator set to "00" (i.e., the value of 2-bit field of the UL-SCH indicator is set to "00") is received, the UE 102 may not transmit the UCI(s) (e.g., the HARQ-ACK(s) and/or the CSI(s)) on the PUSCH. For example, even if the UE 102 has (e.g., would have) the PUSCH transmission with the UL-SCH that overlaps with the PUCCH transmission that includes the UCI(s), in a case that the second DCI format(s) 603 including the UL-SCH indicator set to "00" is received, the UE 102 may not multiplex the UCI(s) on the PUSCH. Namely, in a case that the second DCI format(s) 603 including the UL-SCH indicator set to "00" is received, the UE 102 may not multiplex the UL-SCH and the UCI(s) on the PUSCH. Namely, in a case that the second DCI format(s) 603 including the UL-SCH indicator set to "00" is received, the UE 102 may drop (e.g., omit) the UCI(s) (e.g., the UCI(s) transmission). For example, in a case that the second DCI format(s) 603 including the UL-SCH indicator set to "00" is received, the UE 102 may transmit, in the same timing (e.g., in the same slot and/or in the same symbol), only the UL-SCH on the PUSCH.

Namely, the value of "00" (e.g., the value of 2-bit field for the UL-SCH indicator included in the second DCI format(s) 603) may be used for indicating the UL-SCH is transmitted on the PUSCH (e.g., the UL-SCH shall be transmitted on the PUSCH). Additionally or alternately, the value of "00" (e.g., the value of 2-bit field for the UL-SCH indicator included in the second DCI format(s) 603) may be used for indicating only the UL-SCH is transmitted on the PUSCH (e.g., only the UL-SCH shall be transmitted on the PUSCH). Additionally or alternately, the value of "00" (e.g., the value of 2-bit field for the UL-SCH indicator included in the second DCI format(s) 603) may be used for indicating only the UL-SCH is transmitted without the UCI(s) on the PUSCH (e.g., only the UL-SCH shall be transmitted without the UCI(s) on the PUSCH).

Additionally or alternately, the value of "00" (e.g., the value of 2-bit field for the UL-SCH indicator included in the second DCI format(s) 603) may be used for indicating the offset value="0.0" (i.e., zero) for the UCI(s) (e.g., the HARQ-ACK(s) and/or the CSI(s)). Namely, the value of "00" (e.g., the value of 2-bit field for the UL-SCH indicator included in the second DCI format(s) 603) may be used for indicating the number of resources for the UCI(s) (e.g., the HARQ-ACK(s) and/or the CSI(s)) are "0.0" (i.e., zero).

Additionally or alternately, a value of "01" (e.g., the value of 2-bit field for the UL-SCH indicator included in the second DCI format(s) 603) may be used for indicating the UCI(s) (e.g., the HARQ-ACK(s) and/or the CSI(s)) is transmitted on the PUSCH (e.g., the UCI(s) (e.g., the HARQ-ACK and/or the CSI(s) shall be transmitted on the PUSCH)). Namely, in a case that the second DCI format(s) 603 including the UL-SCH indicator set to "01" (i.e., the value of 2-bit field of the UL-SCH indicator is set to "01") is received, the UE 102 may transmit the UCI(s) (e.g., the HARQ-ACK(s) and/or the CSI(s)) on the PUSCH. For example, even if the UE 102 has (e.g., would have) the PUSCH transmission with the UL-SCH that overlaps with the PUCCH transmission that includes the UCI(s), in a case that the second DCI format(s) 603 including the UL-SCH indicator set to "01" is received, the UE 102 may not multiplex the UL-SCH(s) on the PUSCH. Namely, in a case that the second DCI format(s) 603 including the UL-SCH indicator set to "01" is received, the UE 102 may not multiplex the UL-SCH and the UCI(s) on the PUSCH. Namely, in a case that the second DCI format(s) 603 including the UL-SCH indicator set to "01" is received, the UE 102 may drop (e.g., omit) the UL-SCH(s) (e.g., the UL-SCH(s) transmission). For example, in a case that the second DCI format(s) 603 including the UL-SCH indicator set to "01" is received, the UE 102 may transmit, in the same timing (e.g., in the same slot and/or in the same symbol), only the UCI(s) on the PUSCH.

Namely, the value of "01" (e.g., the value of 2-bit field for the UL-SCH indicator included in the second DCI format(s) 603) may be used for indicating the UCI(s) is transmitted on the PUSCH (e.g., the UCI(s) shall be transmitted on the PUSCH). Additionally or alternately, the value of "01" (e.g., the value of 2-bit field for the UL-SCH indicator included in the second DCI format(s) 603) may be used for indicating only the UCI(s) is transmitted on the PUSCH (e.g., only the UCI(s) shall be transmitted on the PUSCH). Additionally or alternately, the value of "01" (e.g., the value of 2-bit field for the UL-SCH indicator included in the second DCI format(s) 603) may be used for indicating only the UCI(s) is transmitted without the UL-SCH on the PUSCH (e.g., only the UCI(s) shall be transmitted without the UL-SCH on the PUSCH). Namely, the value of "01" (e.g., the value of 2-bit field for the UL-SCH indicator included in the second DCI format(s) 603) may be used for indicating the UL-SCH(s) is not transmitted on the PUSCH (e.g., the UL-SCH(s) shall be transmitted on the PUSCH).

Additionally or alternatively, a value of "10" and/or "11" (e.g., the value of 2-bit field for the UL-SCH indicator included in the second DCI format(s) 603) may be used for indicating the UCI(s) (e.g., the HARQ-ACK(s) and/or the CSI(s)) is multiplexed with the UL-SCH on the PUSCH (e.g., the UCI(s) (e.g., the HARQ-ACK and/or the CSI(s)) shall be multiplexed on the PUSCH)). Namely, in a case that the second DCI format(s) 603 including the UL-SCH indicator set to "10" and/or "11" (i.e., the value of 2-bit field of the UL-SCH indicator is set to "10" and/or "11") is received, the UE 102 may transmit the UCI(s) (e.g., the HARQ-ACK(s) and/or the CSI(s)) multiplexed with the UL-SCH on the PUSCH. For example, if the UE 102 has (e.g., would have) the PUSCH transmission with the UL-SCH that overlaps with the PUCCH transmission that includes the UCI(s), in a case that the second DCI format(s) 603 including the UL-SCH indicator set to "10" and/or "11" is received, the UE 102 may multiplex the UL-SCH and the UCI(s) on the PUSCH. For example, in a case that the second DCI format(s) 603 including the UL-SCH indicator set to "10" and/or "11" is received, the UE 102 may transmit, in the same timing (e.g., in the same slot and/or in the same symbol), the UL-SCH and the UCI(s) on the PUSCH. Namely, in a case that the second DCI format(s) 603 including the UL-SCH indicator set to "10" and/or "11" is received, the UE 102 may transmit the UCI(s) together with the UL-SCH on the PUSCH.

Additionally or alternatively, the value of "10 and/or 11" (e.g., the value of 2-bit field for the UL-SCH indicator included in the second DCI format(s) 603) may be used for indicating the value(s) (e.g., the offset value(s)) to determine the number of resources for the UCI(s) (e.g., the HARQ-ACK(s) and/or the CSI(s)). Namely, as described above, the value of "10 and/or 11" (e.g., the value of 2-bit field for the UL-SCH indicator included in the second DCI format(s) 603) may be used for the offset value (e.g., one offset value) among from more than one offset value(s) configured by using the ninth information. For example, the gNB 160 may transmit, by using the RRC message, more than one offset values (e.g., two offset values). Also, the gNB 160 may transmit the second DCI format(s) 603 including the value of "10 and/or 11" of the UL-SCH indicator used for indicating the offset value (e.g., one offset value) among form the two offset values. And, the UE 102 may determine, based on the one offset value, the number of resources for the UCI(s) (e.g., for the HARQ-ACK(s) and/or for the CSI(s)).

Additionally or alternatively, in a case that the number of bits for the UL-SCH indicator included in the second DCI format(s) 603 is configured to "1-bit", a value of "0" (e.g., the value of 1-bit field of the UL-SCH indicator included in the second DCI format 603) may be used for indicating the UL-SCH is not transmitted on the PUSCH (e.g., the UL-SCH shall not be transmitted on the PUSCH). Also, in a case that the number of bits for the UL-SCH indicator included in the second DCI format(s) 603 is configured to "1-bit", a value of "1" (e.g., the value of 1-bit field of the UL-SCH indicator included in the second DCI format 603) may be used for indicating the UL-SCH is transmitted on the PUSCH (e.g., the UL-SCH shall be transmitted on the PUSCH).

Namely, in a case that the number of bits for the UL-SCH indicator included in the second DCI format(s) 603 is configured to "1-bit", a value of the field for the UL-SCH indicator included in the second DCI format 603 may be used for indicating whether or not the UL-SCH is transmitted on the PUSCH. For example, in a case that the second DCI format 603 including the UL-SCH indicator set to "1" (i.e., the value of 1-bit field of the UL-SCH indicator is set to "1") is received, the UE 102 may transmit the UL-SCH together with the UCI (e.g., the HARQ-ACK(s) and/or the CSI(s)) on the PUSCH. Also, in a case that the second DCI format 603 including the UL-SCH indicator set to "0" (i.e., the value of 1-bit field of the UL-SCH indicator is set to "0") is received, the UE 102 may transmit the UCI(s) (e.g., the HARQ-ACK(s) and/or the CSI(s)) on the PUSCH. Namely, in a case that the UL-SCH indicator is set to "0", only the UCI(s) is transmitted (e.g., the UCI is transmitted without the UL-SCH) on the PUSCH.

Here, in a case that in a case that the number of bits for the UL-SCH indicator included in the second DCI format(s) 603 is configured to "1-bit", the offset value(s) configured, by the gNB 160, by using the RRC message (e.g., the offset value(s) configured by the ninth information as described above) may be used. Namely, in a case that in a case that the number of bits for the UL-SCH indicator included in the second DCI format(s) 603 is configured to "1-bit", the UE 102 may use the configured offset value(s) (e.g., the offset value(s) configured by the ninth information) to determine the number of resources for the UCI(s) (e.g., the HARQ-ACK(s) and/or the CSI(s)).

Additionally or alternatively, in a case that the number of bits for the UL-SCH indicator included in the second DCI format(s) 603 is configured to "0-bit" (e.g., the UL-SCH indicator is not configured for the second DCI format 603, in a case that the UL-SCH indicator is absent in the second DCI format 603), the UE 102 may always multiplex the UL-SCH and the UCI(s) on the PUSCH. For example, in a case that the number of bits for the UL-SCH indicator included in the second DCI format(s) 603 is configured to "0-bit", if the UE 102 has (e.g., would have) the PUSCH transmission with the UL-SCH that overlaps with the PUCCH transmission that includes the UCI(s), the UE 102 may multiplex the UL-SCH and the UCI(s) on the PUSCH.

Here, in a case that in a case that the number of bits for the UL-SCH indicator included in the second DCI format(s) 603 is configured to "0-bit", the offset value(s) configured, by the gNB 160, by using the RRC message (e.g., the offset value(s) configured by the ninth information as described above) may be used. Namely, in a case that in a case that the number of bits for the UL-SCH indicator included in the second DCI format(s) 603 is configured to "0-bit", the UE 102 may use the configured offset value(s) (e.g., the offset value(s) configured by the ninth information) to determine the number of resources for the UCI(s) (e.g., the HARQ-ACK(s) and/or the CSI(s)).

In the description, transmission methods for HARQ-ACK are mainly explained. However, it should be noted that the above methods (and/or similar methods with the above method) may be applicable to transmission methods for CSI.

Figure 7:
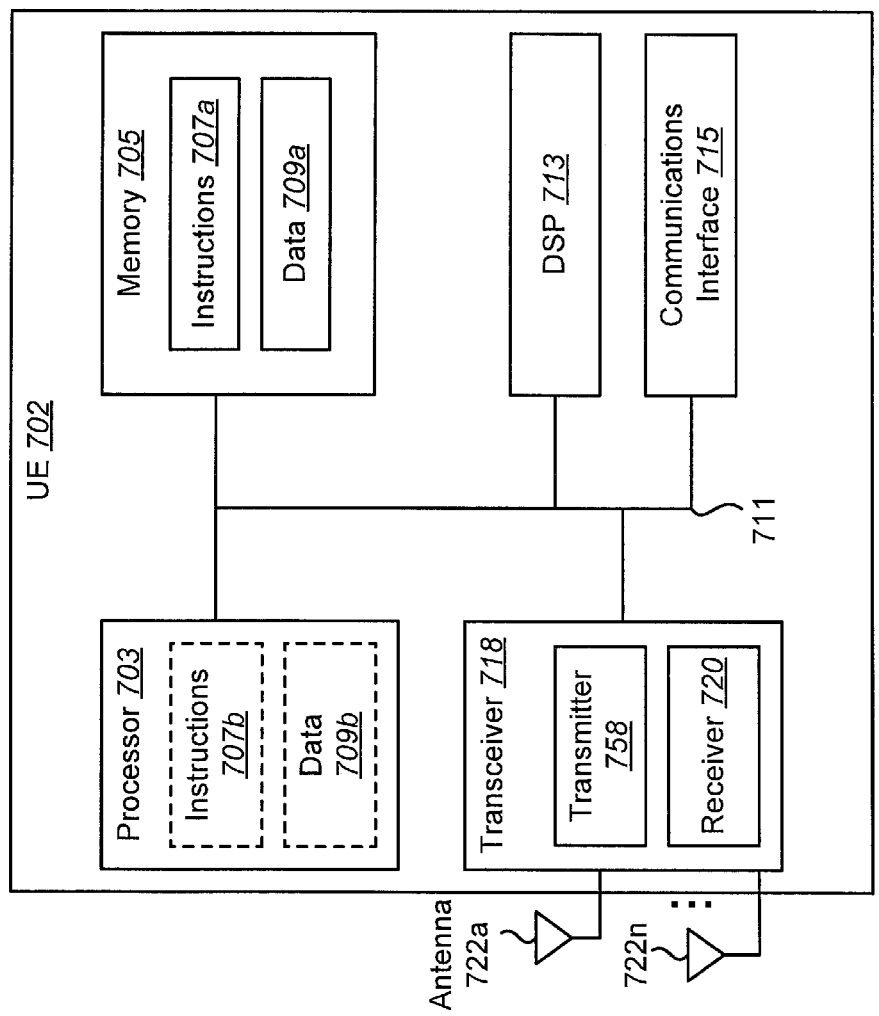
FIG. 7 illustrates various components that may be utilized in a UE.

FIG. 7 illustrates various components that may be utilized in a UE 702. The UE 702 described in connection with FIG. 7 may be implemented in accordance with the UE 102 described in connection with FIG. 1. The UE 702 includes a processor 703 that controls operation of the UE 702. The processor 703 may also be referred to as a central processing unit (CPU). Memory 705, which may include read-only memory (ROM), random access memory (RAM), a combination of the two or any type of device that may store information, provides instructions 707a and data 709a to the processor 703. A portion of the memory 705 may also include non-volatile random access memory (NVRAM). Instructions 707b and data 709b may also reside in the processor 703. Instructions 707b and/or data 709b loaded into the processor 703 may also include instructions 707a and/or data 709*a* from memory 705 that were loaded for execution or processing by the processor 703. The instructions 707*b* may be executed by the processor 703 to implement the methods described herein.

The UE 702 may also include a housing that contains one or more transmitters 758 and one or more receivers 720 to allow transmission and reception of data. The transmitter(s) 758 and receiver(s) 720 may be combined into one or more transceivers 718. One or more antennas 722*a-n* are attached to the housing and electrically coupled to the transceiver 718.

The various components of the UE 702 are coupled together by a bus system 711, which may include a power bus, a control signal bus and a status signal bus, in addition to a data bus. However, for the sake of clarity, the various buses are illustrated in FIG. 7 as the bus system 711. The UE 702 may also include a digital signal processor (DSP) 713 for use in processing signals. The UE 702 may also include a communications interface 715 that provides user access to the functions of the UE 702. The UE 702 illustrated in FIG. 7 is a functional block diagram rather than a listing of specific components.

Figure 8:
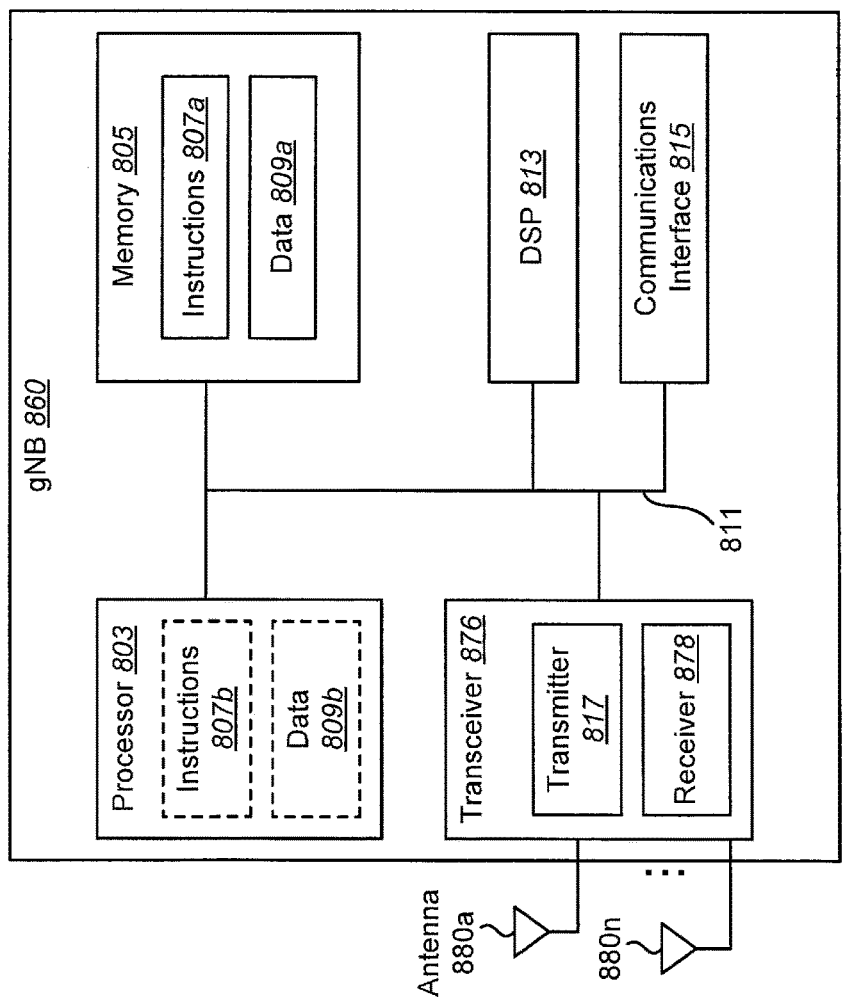
FIG. 8 illustrates various components that may be utilized in a gNB.

FIG. 8 illustrates various components that may be utilized in a gNB 860. The gNB 860 described in connection with FIG. 8 may be implemented in accordance with the gNB 160 described in connection with FIG. 1. The gNB 860 includes a processor 803 that controls operation of the gNB 860. The processor 803 may also be referred to as a central processing unit (CPU). Memory 805, which may include read-only memory (ROM), random access memory (RAM), a combination of the two or any type of device that may store information, provides instructions 807*a* and data 809*a* to the processor 803. A portion of the memory 805 may also include non-volatile random access memory (NVRAM). Instructions 807*b* and data 809*b* may also reside in the processor 803. Instructions 807*b* and/or data 809*b* loaded into the processor 803 may also include instructions 807*a* and/or data 809*a* from memory 805 that were loaded for execution or processing by the processor 803. The instructions 807*b* may be executed by the processor 803 to implement the methods described herein.

The gNB 860 may also include a housing that contains one or more transmitters 817 and one or more receivers 878 to allow transmission and reception of data. The transmitter(s) 817 and receiver(s) 878 may be combined into one or more transceivers 876. One or more antennas 880*a-n* are attached to the housing and electrically coupled to the transceiver 876.

The various components of the gNB 860 are coupled together by a bus system 811, which may include a power bus, a control signal bus and a status signal bus, in addition to a data bus. However, for the sake of clarity, the various buses are illustrated in FIG. 8 as the bus system 811. The gNB 860 may also include a digital signal processor (DSP) 813 for use in processing signals. The gNB 860 may also include a communications interface 815 that provides user access to the functions of the gNB 860. The gNB 860 illustrated in FIG. 8 is a functional block diagram rather than a listing of specific components.

Figure 9:
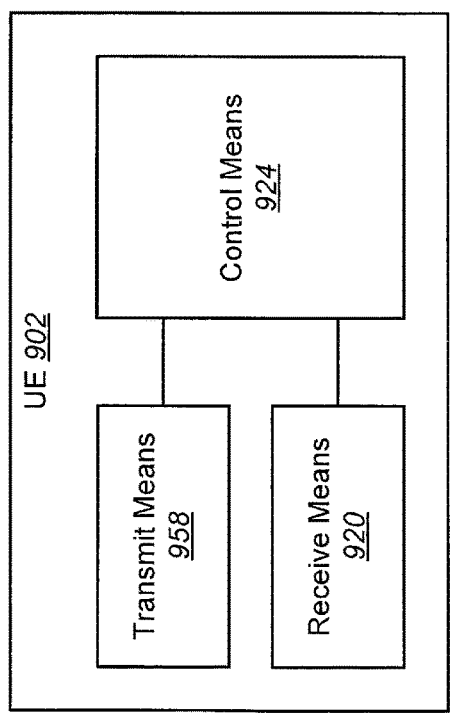
FIG. 9 is a block diagram illustrating one implementation of a UE in which one or more of the systems and/or methods described herein may be implemented.

FIG. 9 is a block diagram illustrating one implementation of a UE 902 in which one or more of the systems and/or methods described herein may be implemented. The UE 902 includes transmit means 958, receive means 920 and control means 924. The transmit means 958, receive means 920 and control means 924 may be configured to perform one or more of the functions described in connection with FIG. 1 above. FIG. 7 above illustrates one example of a concrete apparatus structure of FIG. 9. Other various structures may be implemented to realize one or more of the functions of FIG. 1. For example, a DSP may be realized by software.

Figure 10:
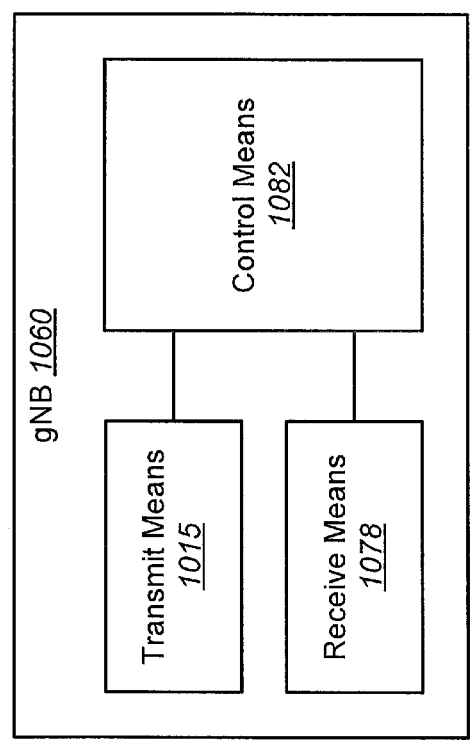
FIG. 10 is a block diagram illustrating one implementation of a gNB in which one or more of the systems and/or methods described herein may be implemented.

FIG. 10 is a block diagram illustrating one implementation of a gNB 1060 in which one or more of the systems and/or methods described herein may be implemented. The gNB 1060 includes transmit means 1017, receive means 1078 and control means 1082. The transmit means 1017, receive means 1078 and control means 1082 may be configured to perform one or more of the functions described in connection with FIG. 1 above. FIG. 8 above illustrates one example of a concrete apparatus structure of FIG. 10. Other various structures may be implemented to realize one or more of the functions of FIG. 1. For example, a DSP may be realized by software.

Figure 11:
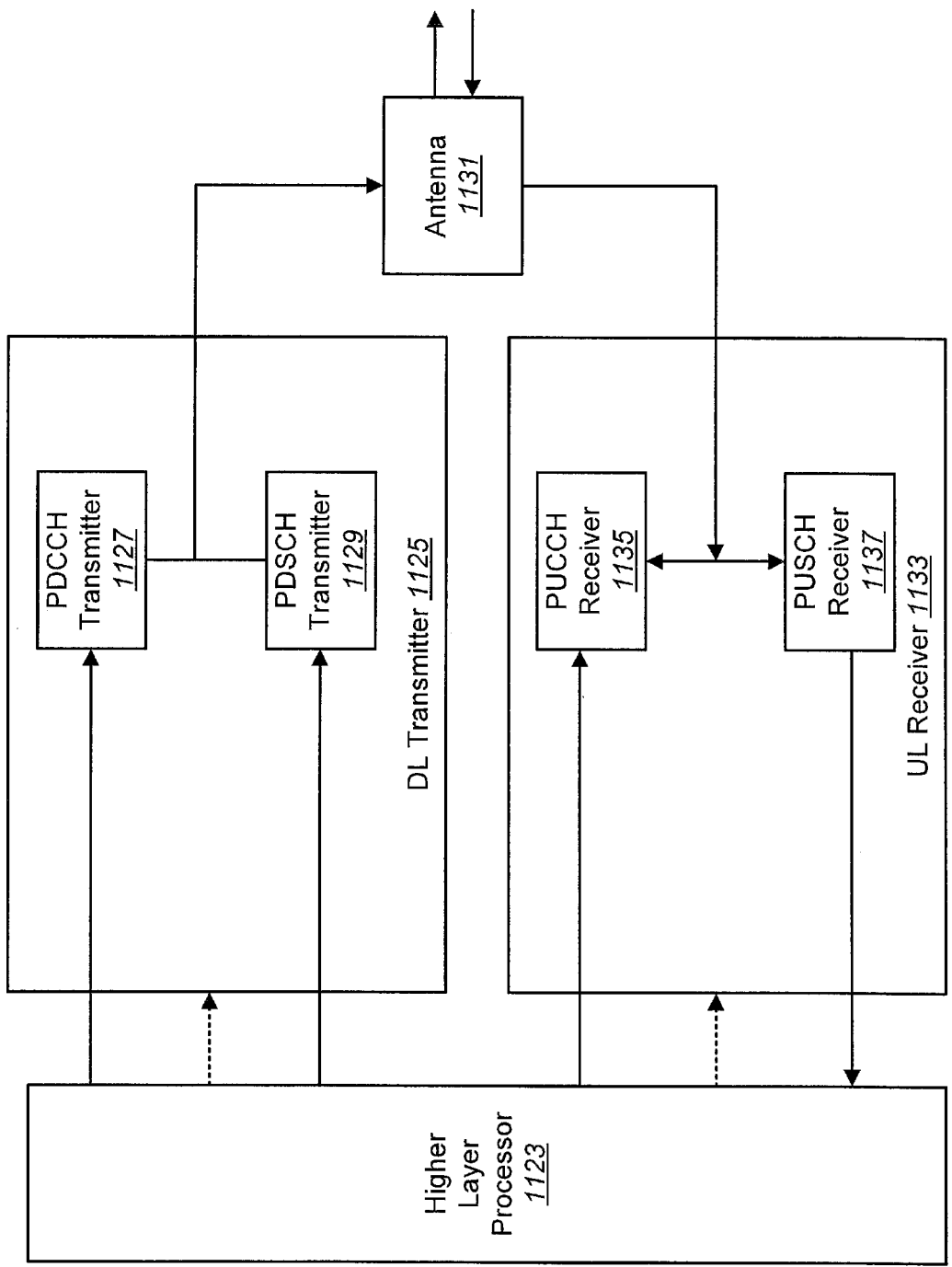
FIG. 11 is a block diagram illustrating one implementation of a gNB.

FIG. 11 is a block diagram illustrating one implementation of a gNB 1160. The gNB 1160 may be an example of the gNB 160 described in connection with FIG. 1. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
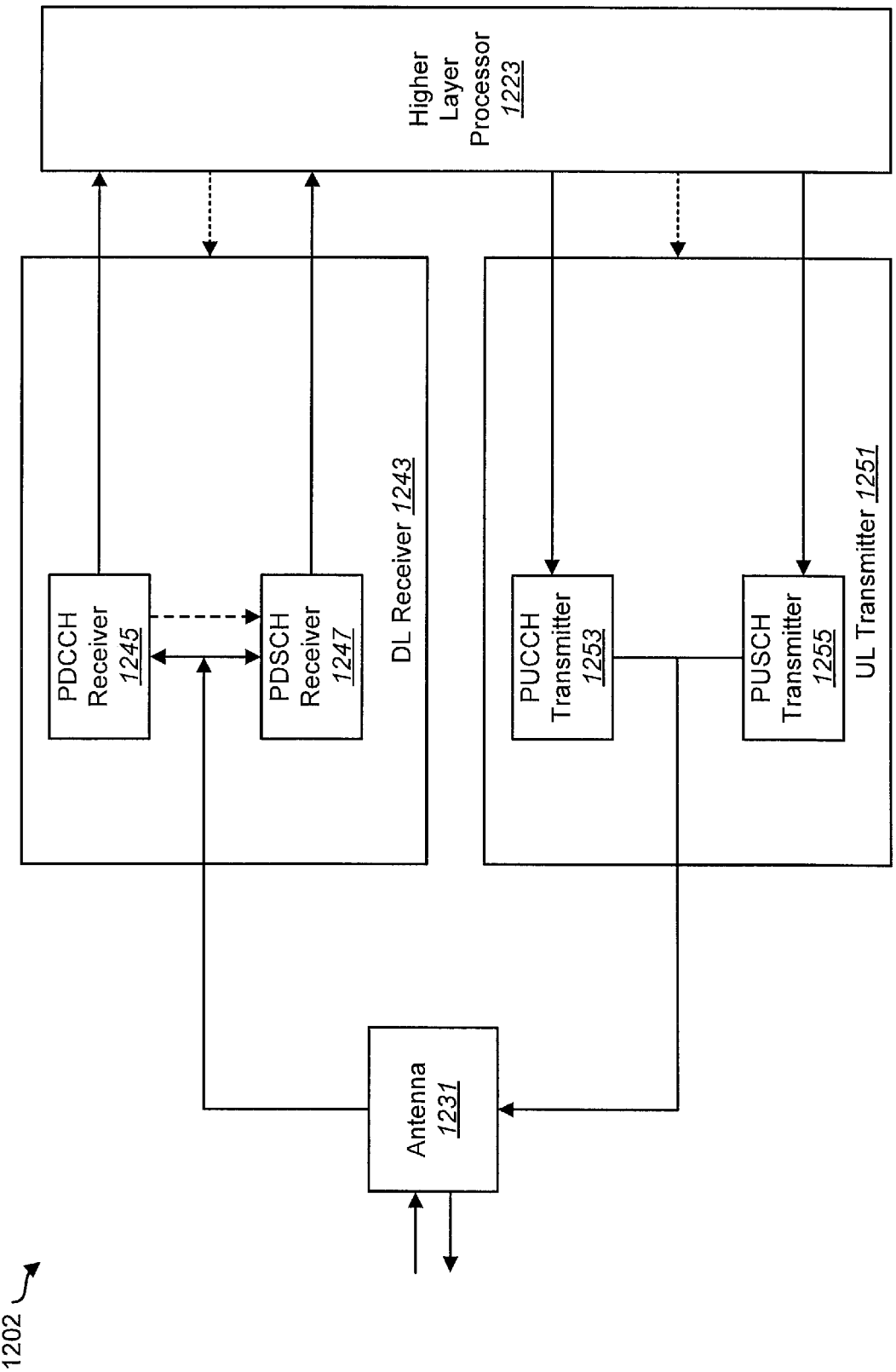
FIG. 12 is a block diagram illustrating one implementation of a UE.

FIG. 12 is a block diagram illustrating one implementation of a UE 1202. The UE 1202 may be an example of the UE 102 described in connection with FIG. 1. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223

DCI. The PDSCH receiver 1247 may provide the higher layer processor 1223 received transport blocks.

As described herein, some methods for the DL and/or UL transmissions may be applied (e.g., specified). Here, the combination of one or more of the some methods described herein may be applied for the DL and/or UL transmission. The combination of the one or more of the some methods described herein may not be precluded in the described systems and methods.

It should be noted that names of physical channels described herein are examples. The other names such as "NRPDCCH, NRPDSCH, NRPUCCH and NRPUSCH," "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described herein is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described herein may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a micro-controller, or a state machine. The general-purpose processor or each circuit described herein may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

CROSS REFERENCE

This Nonprovisional application claims priority under 35 U.S.C. § 119 on provisional Application No. 62/837,325 on Apr. 23, 2019, the entire contents of which are hereby incorporated by reference.

What is claimed is:

1. A user equipment (UE) comprising:
receiving circuitry configured to receive a first downlink control information (DCI) format comprising one bit of a first uplink shared channel (UL-SCH) indicator, the first DCI format being used for scheduling of a first physical uplink shared channel (PUSCH); and
transmitting circuitry configured to perform, based on a detection of the first DCI format, a transmission on the first PUSCH, wherein
the receiving circuitry is further configured to receive a second DCI format comprising zero bit or one bit of a second UL-SCH indicator, the second DCI format being used for scheduling of a second PUSCH, the transmitting circuitry is further configured to perform, based on a detection of the second DCI format, a transmission on the second PUSCH, in a case that a number of bits of the second UL-SCH indicator is zero, the transmitting circuitry is further configured to determine that the number of bits of the second UL-SCH indicator is zero, in a case that the number of bits of the second UL-SCH indicator is one, the transmitting circuitry is further configured to determine that the number of bits of the second UL-SCH indicator is one, the first UL-SCH indicator indicates whether or not a UL-SCH is transmitted on the first PUSCH, and in a case that the number of bits of the second UL-SCH indicator is one, the second UL-SCH indicator indicates whether or not a UL-SCH is transmitted on the second PUSCH.

2. A method performed by a user equipment (UE), the method comprising:

receiving a first downlink control information (DCI) format comprising one bit of a first uplink shared channel (UL-SCH) indicator, the first DCI format being used for scheduling of a first physical uplink shared channel (PUSCH);

performing, based on a detection of the first DCI format, a transmission on the first PUSCH;

receiving a second DCI format comprising zero bit or one bit of a second UL-SCH indicator, the second DCI format being used for scheduling of a second PUSCH;

performing, based on a detection of the second DCI format, a transmission on the second PUSCH;

in a case that a number of bits of the second UL-SCH indicator is zero, determining that the number of bits of the second UL-SCH indicator is zero;

in a case that the number of bits of the second UL-SCH indicator is one, determining that the number of bits of the second UL-SCH indicator is one bit, wherein the first UL-SCH indicator indicates whether or not a UL-SCH is transmitted on the first PUSCH, and in a case that the number of bits of the second UL-SCH indicator is one, the second UL-SCH indicator indicates whether or not a UL-SCH is transmitted on the second PUSCH.

\* \* \* \* \*